United States Patent
Tanabe

(10) Patent No.: US 9,545,891 B2
(45) Date of Patent: Jan. 17, 2017

(54) AIRBAG MODULE-MOUNTING SIDE FRAME AND VEHICLE SEAT PROVIDED WITH SAME

(71) Applicant: TS TECH CO., LTD., Asaka-shi, Saitama (JP)

(72) Inventor: Jinichi Tanabe, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 14/439,118

(22) PCT Filed: Oct. 30, 2013

(86) PCT No.: PCT/JP2013/079390
§ 371 (c)(1),
(2) Date: Apr. 28, 2015

(87) PCT Pub. No.: WO2014/069521
PCT Pub. Date: May 8, 2014

(65) Prior Publication Data
US 2015/0291121 A1    Oct. 15, 2015

(30) Foreign Application Priority Data

Oct. 31, 2012   (JP) .................................. 2012-240038
Nov. 20, 2012   (JP) .................................. 2012-254644

(51) Int. Cl.
*B60R 21/207*   (2006.01)
*B60N 2/64*   (2006.01)
*B60N 2/68*   (2006.01)

(52) U.S. Cl.
CPC ............... *B60R 21/207* (2013.01); *B60N 2/64* (2013.01); *B60N 2/68* (2013.01); *B60N 2/682* (2013.01)

(58) Field of Classification Search
CPC ............. B60N 2/64; B60N 2/68; B60N 2/682; B60R 21/207
See application file for complete search history.

(56) References Cited

U.S. PATENT DOCUMENTS 5,498,030 A * 3/1996 Hill .......................... B60N 2/58
                                                             280/728.1
5,503,428 A * 4/1996 Awotwi ................ B60R 21/207
                                                             280/730.2
(Continued)

FOREIGN PATENT DOCUMENTS

| JP | 10-287196 A | 10/1998 |
| JP | 2001-501844 A | 2/2001 |
| JP | 2012-076545 A | 4/2012 |

OTHER PUBLICATIONS

Office Action issued in related application CN 201380055857.7, Mar. 29, 2016, with partial English language translation, 10 pages.
(Continued)

*Primary Examiner* — Laura Freedman
(74) *Attorney, Agent, or Firm* — Drinker Biddle & Reath LLP

(57) ABSTRACT

Provided is an airbag module-mounting side frame configured to be attachable an airbag with high rigidity and efficiently even when an airbag attachment portion has a closed cross-sectional structure. A side frame which forms a seat and on which an airbag module is mounted is provided. A portion of the side frame to which the airbag module is attached has a closed cross-sectional structure. An attachment member that connects the airbag module and the side frame is disposed to connect an inner wall surface of the closed cross-sectional structure arranged on an outer side of the seat and an inner wall surface of the closed cross-sectional structure arranged on an inner side of the seat.

16 Claims, 18 Drawing Sheets

(56) References Cited

U.S. PATENT DOCUMENTS

| | | | | |
|---|---|---|---|---|
| 5,533,750 A * | 7/1996 | Karlow | ............... | B60R 21/201 280/728.2 |
| 5,553,887 A * | 9/1996 | Karlow | ............... | B60R 21/201 280/728.3 |
| 5,651,582 A * | 7/1997 | Nakano | ............... | B60R 21/207 280/730.2 |
| 5,803,490 A * | 9/1998 | Seventko | ............. | B60R 21/207 280/728.2 |
| 6,149,231 A * | 11/2000 | Wustholz | ............... | B60N 2/48 280/730.1 |
| 6,217,062 B1 * | 4/2001 | Breyvogel | ............... | B60N 2/68 280/728.2 |
| 6,378,946 B1 * | 4/2002 | Cope | ................ | B60N 2/64 297/452.18 |
| 7,866,689 B2 * | 1/2011 | Saberan | ................ | B60N 2/68 280/730.2 |
| 8,171,868 B2 * | 5/2012 | Evans | ................ | B60N 2/58 112/475.08 |
| 9,079,556 B2 * | 7/2015 | Tanabe | ................ | B60R 21/207 |
| 2015/0076802 A1 * | 3/2015 | Tanabe | ................ | B60N 2/68 280/730.2 |

OTHER PUBLICATIONS

Office Action issued in related application JP 2012-254644, Jul. 12, 2016, with machine generated English language translation, 6 pages.

* cited by examiner

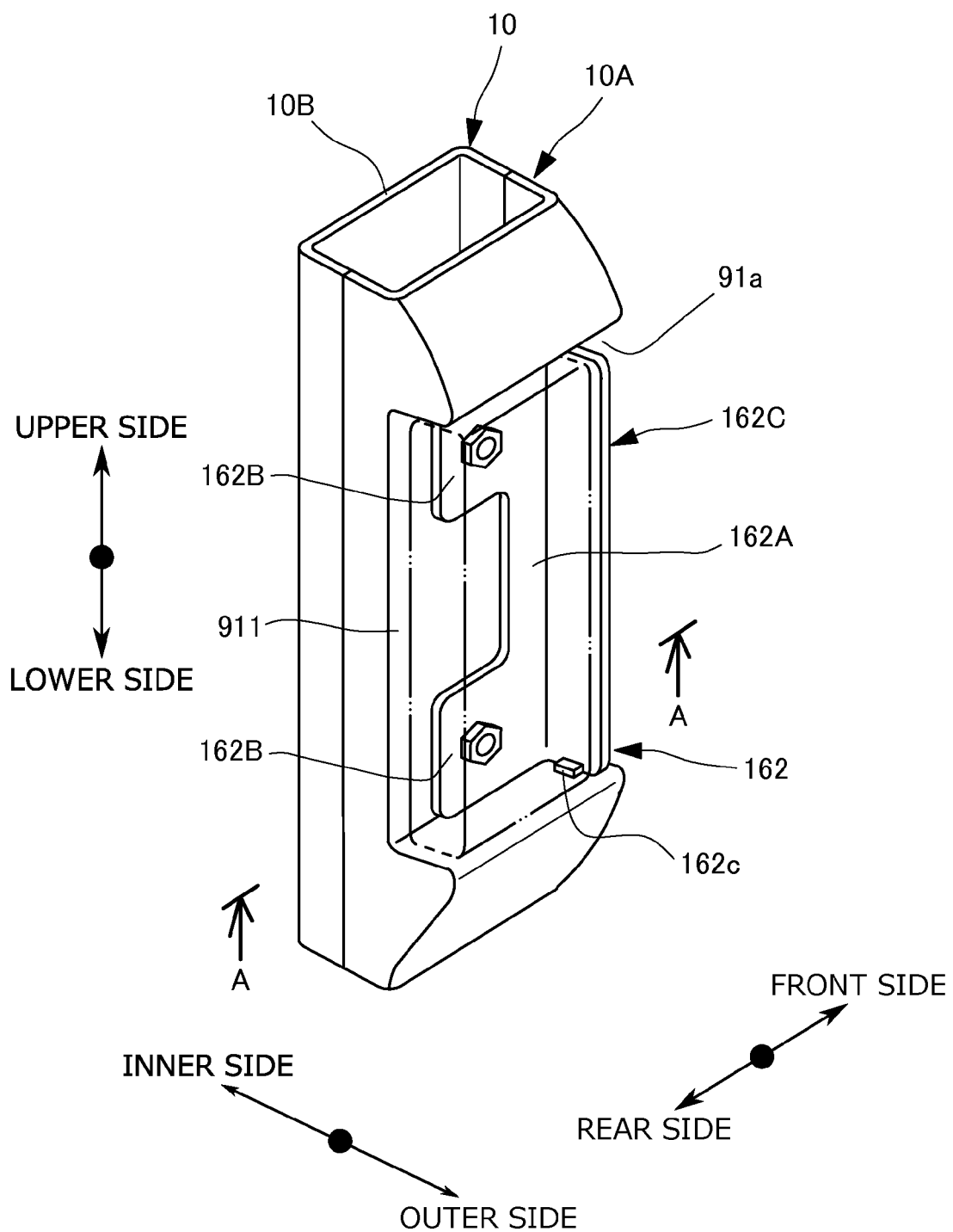

AIRBAG MODULE-MOUNTING SIDE FRAME AND VEHICLE SEAT PROVIDED WITH SAME

CROSS REFERENCE TO RELATED APPLICATIONS

This application is a National Stage Entry application of PCT Application No. PCT/JP2013/079390, filed Oct. 30, 2013, which claims the priority benefit of Japanese Patent Application No. 2012-240038, filed Oct. 31, 2012, and Japanese Patent Application No. 2012-254644, filed Nov. 20, 2012, the contents of all being incorporated herein by reference.

BACKGROUND

Disclosed herein is an airbag module-mounting side frame and a vehicle seat provided with the same, and particularly, an airbag module-mounting side frame which is preferably applicable when an airbag attachment portion has a closed cross-section and a vehicle seat provided with the same.

Conventionally, a vehicle seat on which an airbag module is mounted so that an airbag can be deployed and inflated outward in response to large impact force in the event of a collision or the like has been used.

Such an airbag module is often attached to a frame which serves as a framework of a vehicle seat, a space where no cushion pad is present is formed in this attachment position, and the airbag module and its peripheral members are accommodated in this space.

As described above, although the airbag module is often attached to a frame, a large number of frames have a closed cross-sectional shape as well as a flat-plate shape.

That is, a hollow-shaped frame of which the outer surface, the inner surface, and the side surfaces are closed is often used, and a technique for attaching an airbag module to the outer surface of such a frame is required (for example, see Japanese Patent Document No. 2012-076545 A ("the '545 Document")).

The '545 Document discloses a vehicle seat on which an airbag module is mounted.

A side frame that forms a vehicle seat according to the '545 Document has a closed cross-sectional shape, and an airbag module is mounted on an outer side surface thereof.

According to this technique, the airbag module and the frame are fastened by a bolt that is inserted through an outer surface of a closed sectional structure portion.

That is, the bolt is inserted through an outer surface of the frame and is fastened to a nut disposed on the inner side of the closed sectional surface of the frame. The leg side of the bolt is positioned on the inner side of the closed sectional surface of the frame.

According to the technique disclosed in the '545 Document, an airbag module can be effectively attached to a frame having a closed sectional surface.

Moreover, although such an airbag module is often attached to a side frame in a state of being accommodated in a storage case, a technique for arranging the airbag module in a frame having a closed sectional surface without using such a storage case is required.

As a technique that solves such a problem, a technique of mounting an airbag module in a recess formed in a side frame or the like is proposed, for example.

When the airbag module is mounted in the formed recess as such, it is possible to accommodate the airbag module efficiently without any adverse effect on the appearance (for example, see Japanese Patent Document No. 2001-501844 A ("the '844 Document")).

The '844 Document discloses a seat backrest frame.

A lateral member (a portion corresponding to a so-called "side frame") that forms the backrest frame according to this technique has a groove shape which is open to the rear side and extends in an up to down direction. The lateral member is configured such that a member (electric motor) that forms a back supporting member and an airbag module can be accommodated in this groove-shaped portion.

According to the technique disclosed in the '844 Document, an airbag can be attached to the lateral member (side frame).

As described above, although the technique of the '545 Document can attach an airbag module to a side frame having a closed cross-section, development of a technique for attaching the airbag module to the side frame easily with high rigidity is required.

Moreover, although the technique of the '844 Document can attach an airbag efficiently by forming a recess in a side frame and storing an airbag module in this recess, development of a technique for attaching the airbag to the side frame easily with high rigidity is required.

That is, a technique of attaching an airbag module to a side frame having a closed cross-section with high rigidity and improved attachment workability is required. Further, a technique of attaching an airbag module to a recess formed in a side frame having a closed cross-section with high rigidity and improved attachment workability without using a storage case for the airbag module is required.

Various embodiments described herein have been provided in view of the problems of the conventional art, and an object of these is to provide an airbag module-mounting side frame configured to be attachable an airbag with high rigidity and efficiently even when an airbag attachment portion has a closed cross-sectional structure and to provide a vehicle seat provided with the same.

Another object is to provide an airbag module-mounting side frame capable of easily attaching an airbag module to a recess of a side frame having a closed sectional structure efficiently and having high attachment rigidity and to provide a vehicle seat provided with the same.

SUMMARY

The problems are solved by an airbag-mounting side frame described herein. The airbag-mounting side frame is an airbag module-mounting side frame which forms a seat and on which an airbag module is mounted, in which a portion of the side frame to which the airbag module is attached has a closed cross-sectional structure, and an attachment member that connects the airbag module and the side frame is disposed to connect an inner wall surface of the closed cross-sectional structure arranged on an outer side of the seat and an inner wall surface of the closed cross-sectional structure arranged on an inner side of the seat.

Due to such a configuration, when an airbag module is attached to a side frame having a closed sectional structure, an attachment member for connecting the airbag module and the side frame is disposed to extend across a void portion (the inner side of the closed sectional structure).

That is, the outer side of the side frame, the attachment member (inside the closed sectional structure), and the inner side of the side frame are arranged in that order from the outward direction of the seat.

Thus, the supporting rigidity of the airbag module is improved.

The seat mentioned herein may be a seat on which an airbag module having a so-called seat back and a seating portion is mounted and can be effectively used as a vehicle seat.

The problems are solved by a further airbag-mounting side frame described herein. The airbag-mounting side frame is an airbag module-mounting side frame which forms a seat and on which an airbag module is mounted, in which the airbag module is arranged in an arrangement recess which is a recess formed in an outer surface of the side frame, and is attached by an attachment member that connects the airbag module and the side frame, and a portion which is a surface that forms an upper side of the arrangement recess and which is positioned near an upper end of the airbag module is formed to protrude outward.

In various embodiments, the arrangement recess is formed in the side frame and the airbag module is stored in the arrangement recess.

The surface that forms the upper side of the arrangement recess is configured to protrude in the outward direction.

Thus, the rigidity of the side frame is improved, and hence, the supporting rigidity of the airbag module is also improved.

The seat mentioned herein may be a seat which has a so-called seat back and a seating portion and on which an airbag module is mounted and can be effectively employed as a vehicle seat.

As in the airbag-mounting side frame according to various embodiments, an airbag module-mounting side frame which forms a seat and on which an airbag module is mounted, in which a portion of the side frame to which the airbag module is attached has a closed cross-sectional structure, the airbag module is arranged in an arrangement recess which is a recess formed in an outer surface of the side frame, a portion which is a surface that forms an upper side of the arrangement recess and which is positioned near an upper end of the airbag module is formed to protrude outward, an attachment member that connects the airbag module and the side frame is disposed to connect an inner wall surface of the closed cross-sectional structure arranged on an outer side of the seat and an inner wall surface of the closed cross-sectional structure arranged on an inner side of the seat is more preferable since the airbag-mounting side frame can provide the operation and effects described above.

Moreover, in this case, the side frame forms the closed cross-sectional structure by combining frame members separated in a plurality of frames in a width direction of the seat or a front to back direction of the seat, and the plurality of frame members are configured to be detachable.

Due to such a configuration, the maintenance property of the airbag module attachment portion is improved.

Further, in this case, the plurality of frame members are separated in a width direction of the seat, and the frame members are connected at least two position with an attachment position of the airbag module to the side frame interposed in a front to back direction.

Since the side frame (which is a supporting member of the airbag module) is connected with the airbag module attachment portion interposed, the supporting rigidity of the airbag module is improved.

In this case, as a specific application, the plurality of frame members may be bonded in an attachment force direction following an application direction of attachment force when the airbag module is attached to the side frame.

Since the attachment force (fastening force) of the attachment member for attaching the airbag module follows the application direction of the attachment (bonding) force of the respective separable frame members, the attachment (bonding) force between the respective frame members is improved.

Further, in this case, the attachment member is preferably accommodated in the closed cross-sectional structure of the side frame.

With such a configuration, the airbag module can be accommodated in a compact space, and thus preferable.

Moreover, in this case, a hole is preferably formed at a position of the side frame facing the attachment member.

With such a configuration, the attachment state of the attachment member can be easily checked through the hole. Moreover, it is possible to access the attachment member through the hole during maintenance.

Further, in this case, as a specific application, the attachment member preferably includes at least a first attachment member and a second attachment member, the first attachment member is preferably attached to extend from the airbag module and the second attachment member is attached to extend from a side opposite to the attachment position of the airbag module to the side frame with the closed cross-sectional structure interposed, the first attachment member is preferably connected to the second attachment member inside the closed cross-sectional structure, a head portion is preferably formed in the first attachment member and the second attachment member so that the head portion has a larger diameter than that of a connection portion of the first attachment member and the second attachment member, and the head portion is preferably arranged on an outer surface of the side frame to restrict the outer surface of the side frame in the seat width direction.

With such a configuration, the attachment rigidity of the airbag module is improved.

Moreover, in this case, an outer-end side of a surface that forms an upper side of the arrangement recess and faces an upper end surface of the airbag module is preferably positioned closer to an outer side than the upper end surface of the airbag module, and is preferably positioned closer to the outer side than an outer upper end of the side frame.

In this manner, the portion extending from the upper side of the side frame to the arrangement recess is configured to protrude gently outward (to form an inclined surface that faces outward), and the surface that forms the upper side of the arrangement recess is configured to protrude outward to extend further outward than the upper end surface of the airbag module.

Thus, the airbag module can be disposed in a compact space.

Further, in this case, the side frame is preferably configured to be divided in a width direction of the seat, one frame is preferably arranged on an inner side in the seat width direction, the other frame is preferably arranged on the outer side, and the arrangement recess is preferably formed in the other frame, and one frame can preferably be detachably attached to the other frame.

In this manner, the seat frame is divided in the seat width direction and one of the divided seat frames forms the arrangement recess.

Since the arrangement recess is formed in the side frame on the outer rear side, it is possible to share the right and left seat back frames (to share one seat back frame arranged on the inner side), and a separate member where the arrangement recess is not formed can be attached to the side where the airbag module is not attached as an attachment.

Moreover, in this case, a restricting portion that extends outward in the seat width direction is preferably provided in a portion of the arrangement recess disposed closer to a front surface of the airbag module.

With such a configuration, the deployment direction of the airbag can be restricted by the restricting portion provided on the front surface side of the airbag module.

Although the restricting portion can be preferably used if it is configured as a flat plate-shaped wall, a plurality of flat plates may be arranged in parallel with a predetermined gap and a plurality of bars may be erected. The shape or the like of the restricting portion is optional as long as it can achieve the object of restricting the deployment direction of the airbag.

Further, in this case, as a specific application, the restricting portion preferably forms an attachment member which is formed as a separate member from the side frame, the attachment member further comprises a plurality of rearward extension portions extending at a predetermined angle from the restricting portion, a predetermined gap is preferably formed between adjacent rearward extension portions, and when the rearward extension portion is attached to the arrangement recess, the restricting portion is preferably arranged on a rear side, and the gap between the adjacent rearward extension portions is preferably recessed toward the front side.

With such a configuration, it is possible to suppress the area of the attachment portion of the rearward extension portion which is an attachment portion of the restricting portion as much as possible.

Moreover, in this case, the restricting portion is preferably formed in a flat-plate shape, and the restricting portion is preferably configured to be pivotable in relation to the rearward extension portion.

More specifically, the restricting portion is preferably configured to be pivotable in relation to the rearward extension portion by a hinge arranged in a boundary portion between the restricting portion and the rearward extension portion.

Due to such a configuration, it is possible to restrict the deployment direction of the airbag effectively.

Although the pivoting of the restricting portion in relation to the rearward extension portion may be realized by an arbitrary method such as the use of biasing force of an elastic member, the use of a hinge is preferable since it is simple and is implemented with low cost.

Further, in this case, a wall portion that extends outward in the seat width direction is preferably provided on a portion of the arrangement recess disposed closer to a rear surface of the airbag module.

With such a configuration, the rear surface of the airbag module can be protected, and the airbag can be supported properly during deployment of the airbag.

A vehicle seat includes at least: a seat back frame having the side frame according to embodiments; and a seating frame connected indirectly or directly to a portion of the seat back frame.

According to various embodiments, the attachment rigidity of an airbag module can be improved when the airbag module is mounted on a side frame having a closed cross-sectional structure.

According to various embodiments, the rigidity of the side frame is improved, and hence, the supporting rigidity of the airbag module is also improved.

According to various embodiments, the maintenance property of the airbag module attachment portion can be improved.

According to various embodiments, the supporting rigidity of the airbag module can be improved.

According to various embodiments, the bonding force of the respective frame members can be improved.

According to various embodiments, it is possible to realize compact arrangement and contribute to a reduction in the size.

According to various embodiments, it is possible to check the attachment state of the attachment member easily and to improve the maintenance property.

According to various embodiments, the attachment rigidity of the airbag module can be improved.

According to various embodiments, the airbag module can be disposed in a compact space.

According to various embodiments, it is possible to share the right and left seat back frames and a separate member where the arrangement recess is not formed can be attached to the side where the airbag module is not attached as an attachment.

According to various embodiments, it is possible to restrict the deployment direction of the airbag.

According to various embodiments, the area of the attachment portion of the restricting portion can be suppressed as much as possible.

According to various embodiments, it is possible to restrict the deployment direction of the airbag effectively.

According to various embodiments, the rear surface of the airbag module can be protected, and the airbag can be supported properly during deployment of the airbag.

According to various embodiments, a vehicle seat provided with the airbag module-mounting side frame which provides improved attachment rigidity can be provided.

BRIEF DESCRIPTION OF THE DRAWINGS

FIG. 16 is an explanatory perspective view illustrating an arrangement state of the module attachment member of the side frame according to the third embodiment of the present invention;

DETAILED DESCRIPTION

Hereinafter, a module holder and an airbag module-equipped seat according to embodiments of the present invention will be described with reference to the drawings.

Figure 6:
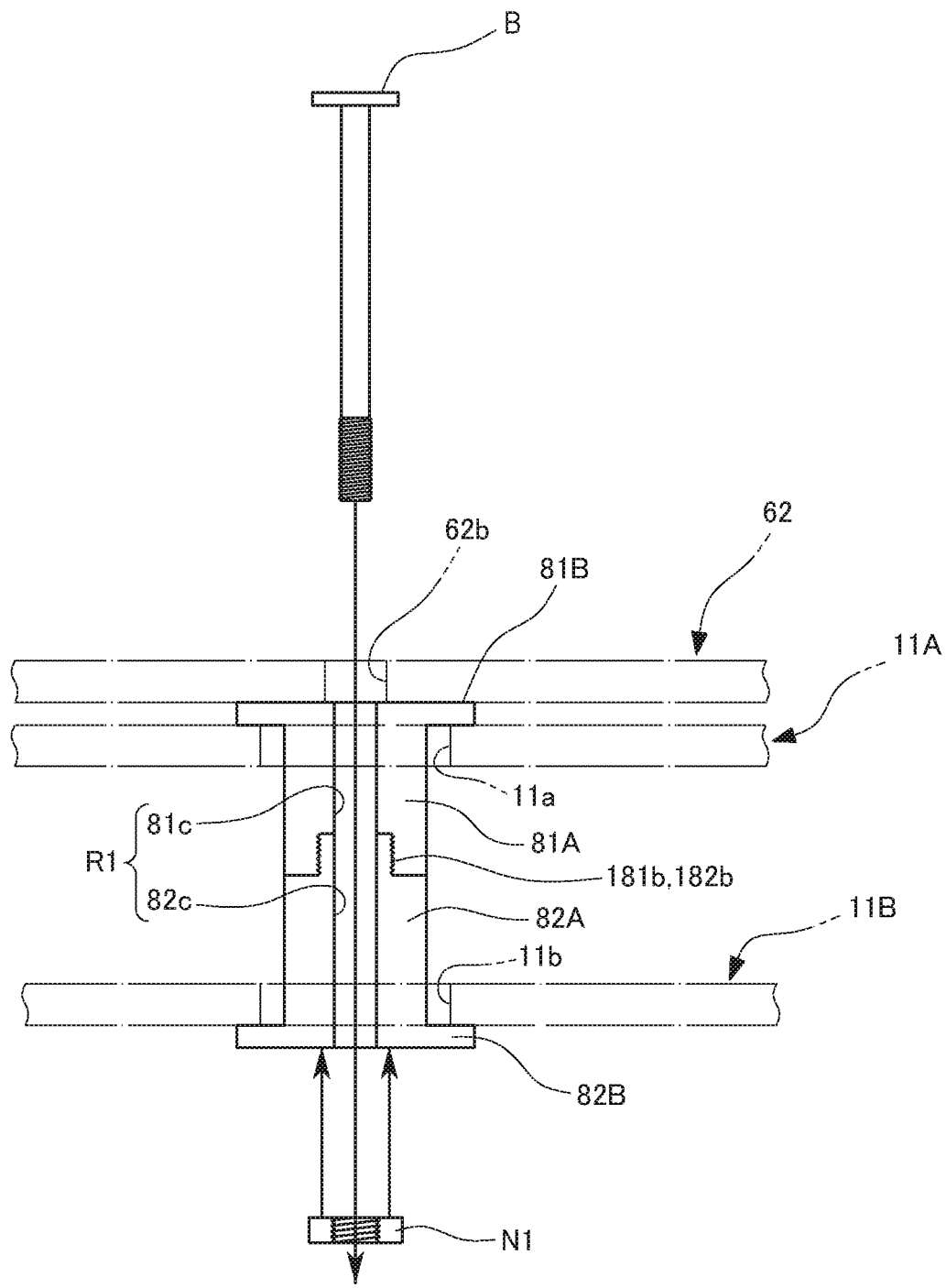
FIG. 6 is an explanatory cross-sectional view illustrating a method of attaching the airbag attachment member according to the first embodiment of the present invention.
Figure 7:
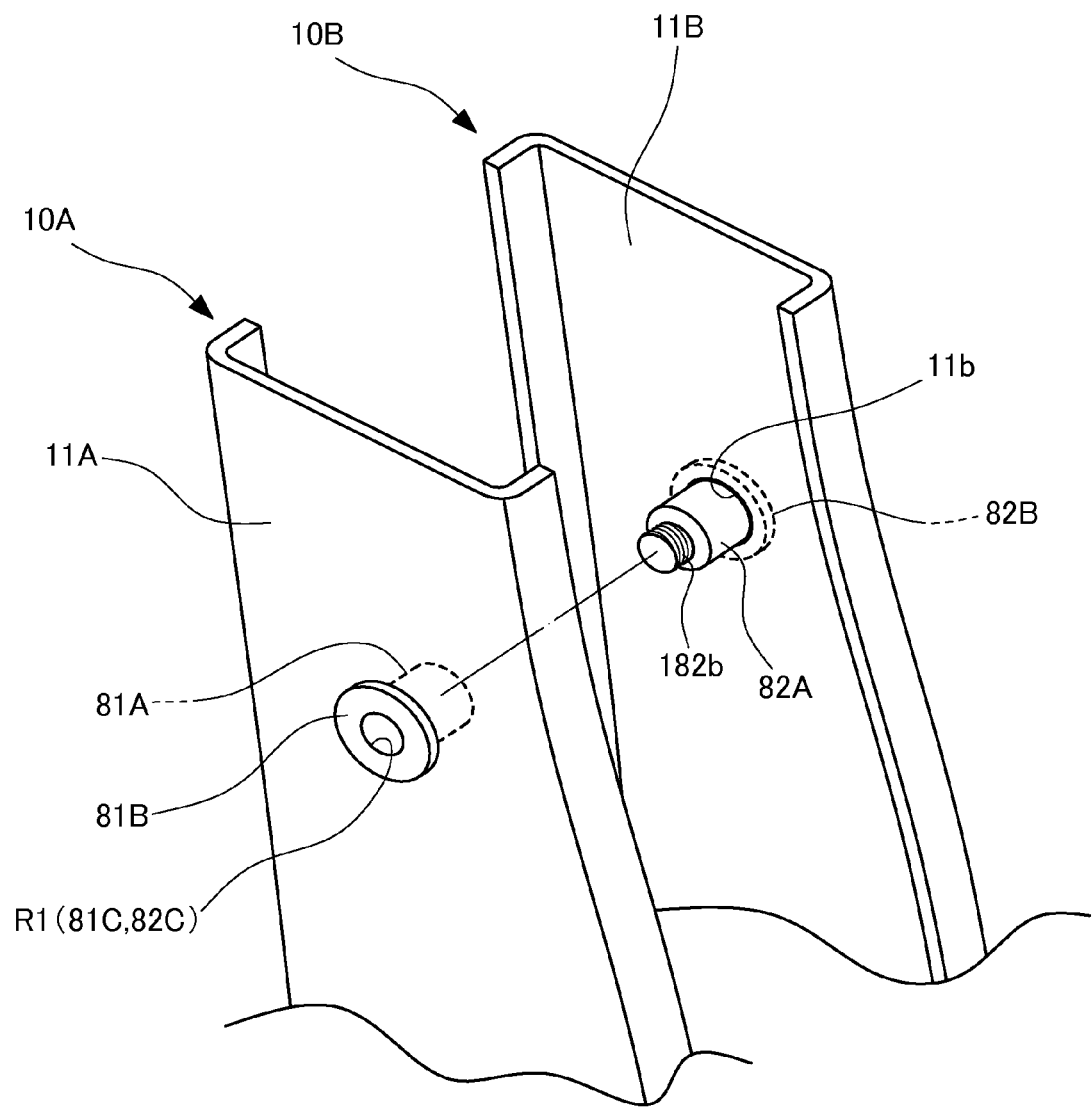
FIG. 7 is an explanatory perspective exploded view diagram illustrating a method of attaching the airbag attachment member according to the first embodiment of the present invention.
Figure 8:
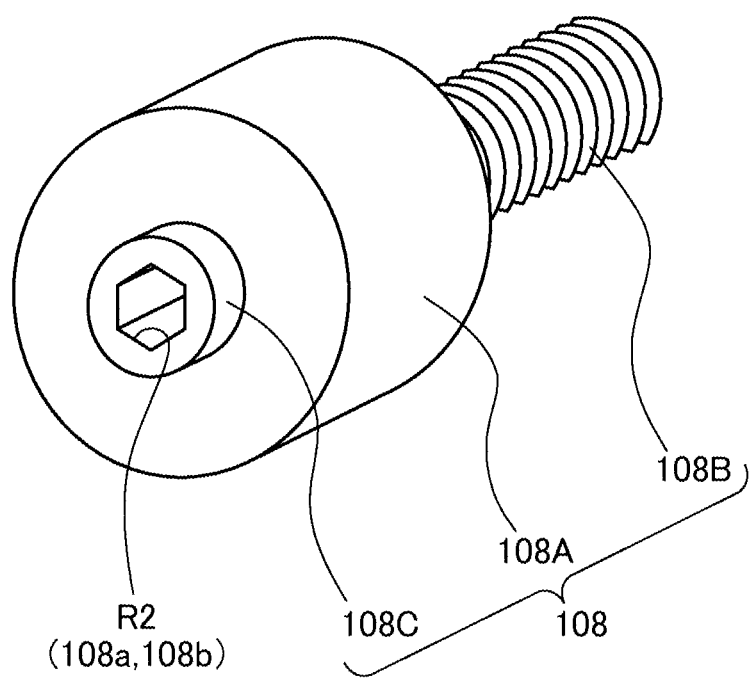
FIG. 8 is an explanatory perspective view of an airbag attachment member (another example) according to a second embodiment of the present invention.
Figure 9:
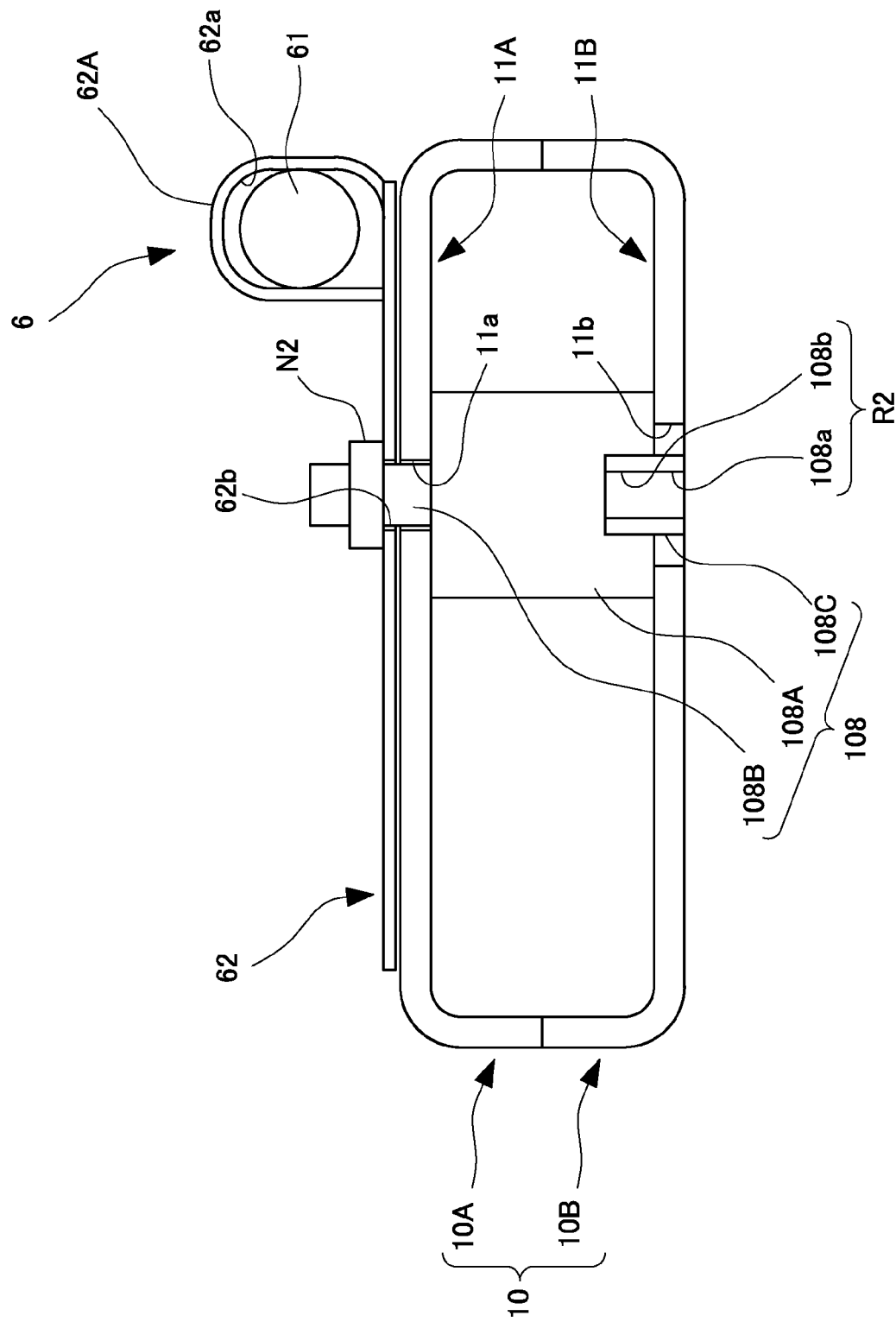
FIG. 9 is a cross-sectional view at a position corresponding to line A-A in FIG. 3.
Figure 10:
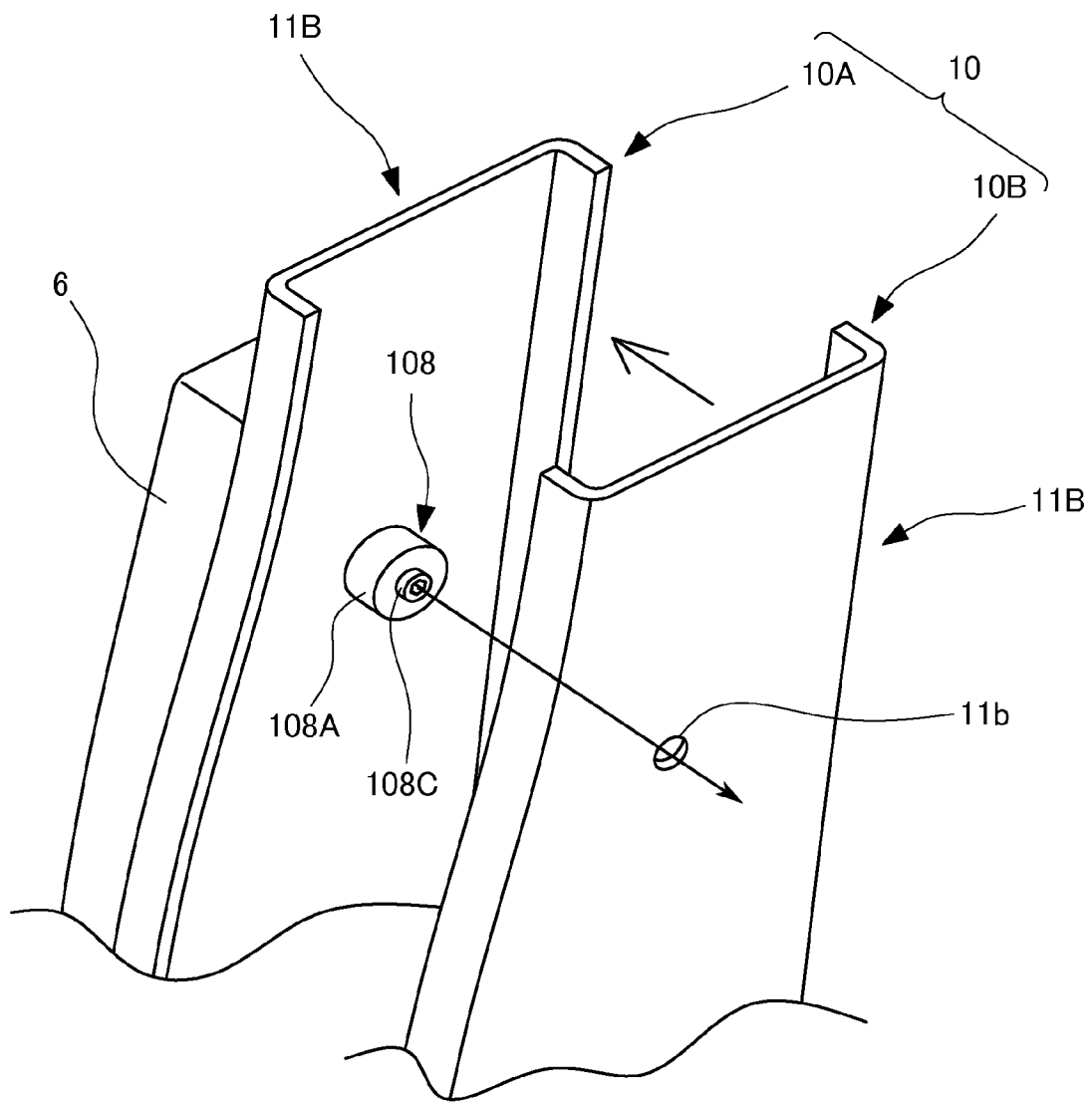
FIG. 10 is an explanatory perspective exploded view diagram of a method of attaching an airbag attachment member (another example) according to the second embodiment of the present invention.

FIGS. 1 to 7 illustrate a first embodiment of the present invention and FIGS. 8 to 10 illustrate a second embodiment of the present invention. FIGS. 11 to 18 illustrate a third embodiment of the present invention.

The following configuration is an example of an implementation of various embodiments of the present invention, and the arrangement, number, shapes, and the like of components are not limited to this configuration, but can be changed without departing from the spirit of the invention.

Naturally, the changes fall within the scope of equivalence.

First Embodiment

Figure 1:
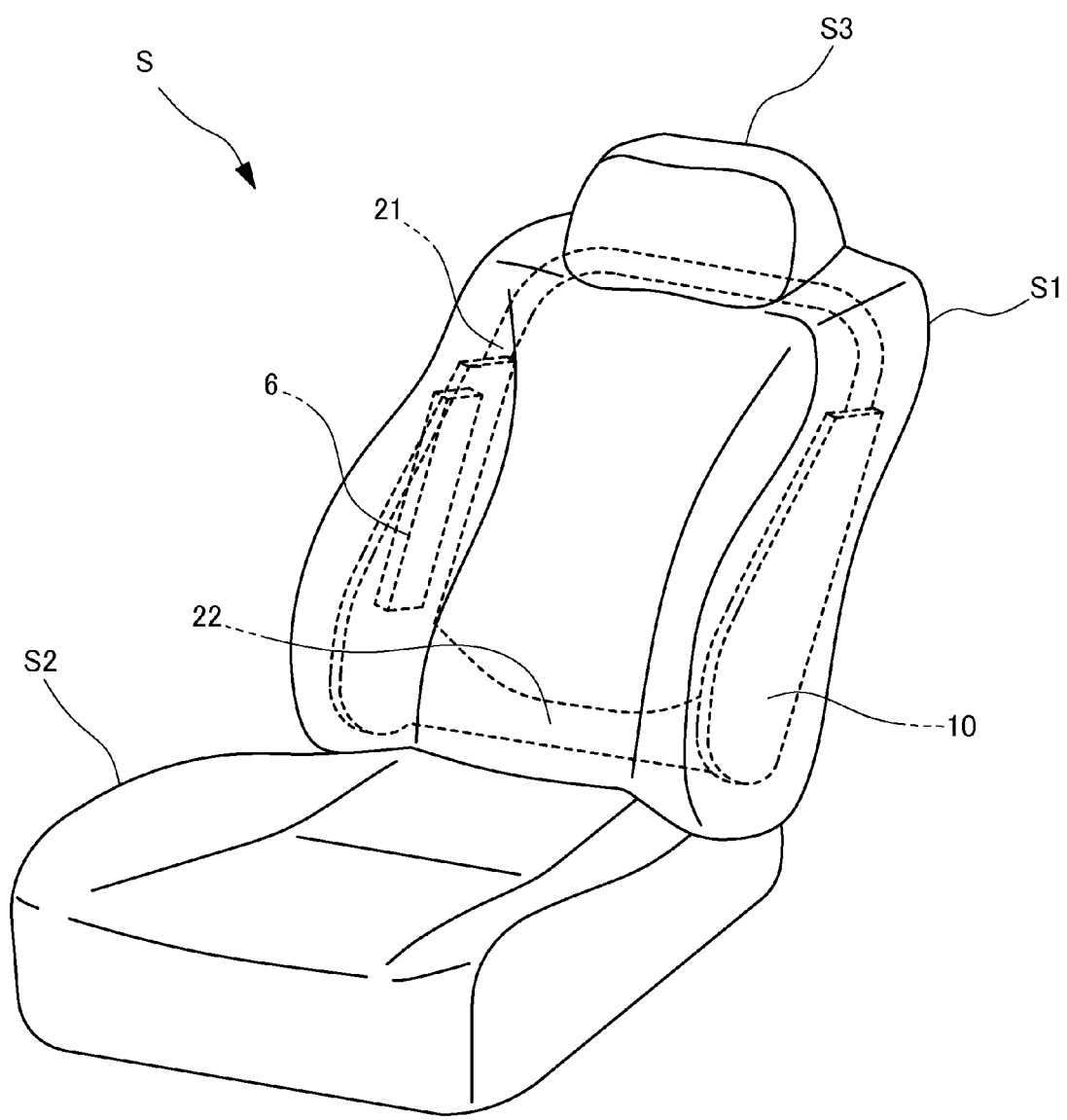
FIG. 1 is an external perspective view of an airbag module-equipped seat according to a first embodiment of the present invention.

As illustrated in FIG. 1, a vehicle seat S according to the present embodiment includes a seat back S1, a seating portion S2, and a headrest S3.

Figure 2:
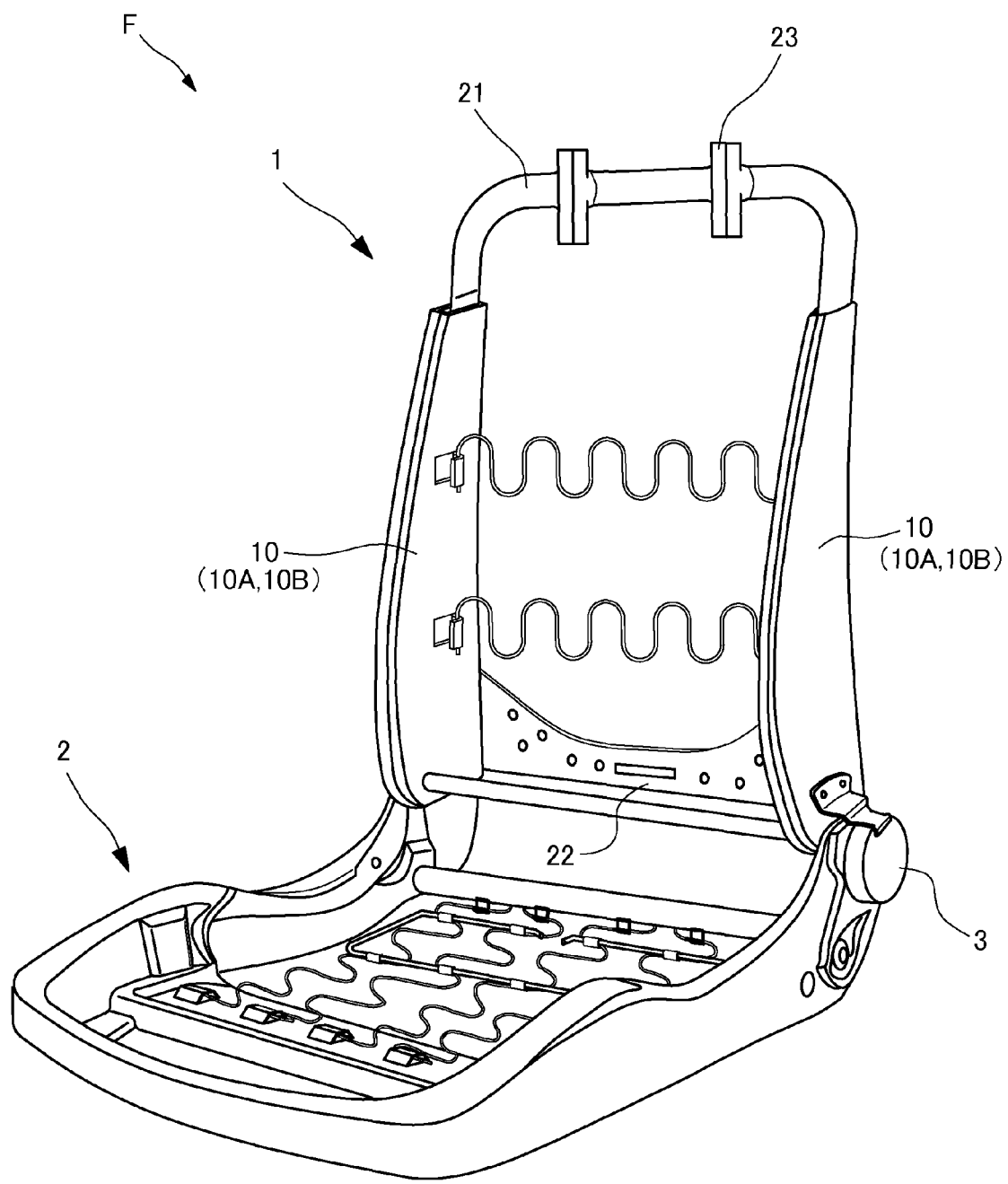
FIG. 2 is a perspective view of a seat frame of the airbag module-equipped seat according to the first embodiment of the present invention.

A seat frame F as illustrated in FIG. 2 is provided in the vehicle seat S. The seat frame F includes a seat back frame 1 which is a frame of the seat back S1 and a seating frame 2 which is a frame of the seating portion S2.

The seating frame 2 is formed in a rectangular frame in a plan view, and in particular, in the present embodiment, is integrally molded with carbon fiber-reinforced plastic (CFRP) as a resin material.

In this example, the seating frame 2 and the seat back frame 1 are connected by a reclining mechanism 3.

A cushion and a trim cover are provided on the outer side of the seat back frame 1 and the seating frame 2 whereby the seat back S1 and the seating portion S2 are formed.

As illustrated in FIGS. 1 and 2, the seat back S1 includes the seat back frame 1, a cushion pad placed on the seat back frame 1, and a trim cover that covers the seat back frame 1 and the cushion pad.

A pair of stay clothes has one end sewn to a breaking portion of a trim cover, which is not illustrated in the drawings in this example, and a deployment force is transmitted to the breaking portion of the trim cover during deployment of an airbag 63 mounted on an airbag module 6.

As illustrated in FIGS. 1 and 2, the seat back frame 1 is formed in a frame shape and includes side frames 10 disposed to be separated from each other in the right and left direction and to extend in the up to down direction, an upper frame 21 that connects the upper ends of the side frames 10, and a lower frame 22 that connects the lower ends of the side frames 10.

Pillar supporting portions 23 are provided in the upper frame 21, and a headrest frame (not illustrated) is attached to the pillar supporting portions 23. A cushion member is provided on the outer side of the headrest frame whereby the headrest S3 is formed.

The side frame 10 is molded by pressing a metal plate, and in the present embodiment, the side frame 10 is formed by combining an outer frame 10A and an inner frame 10B.

Figure 3:
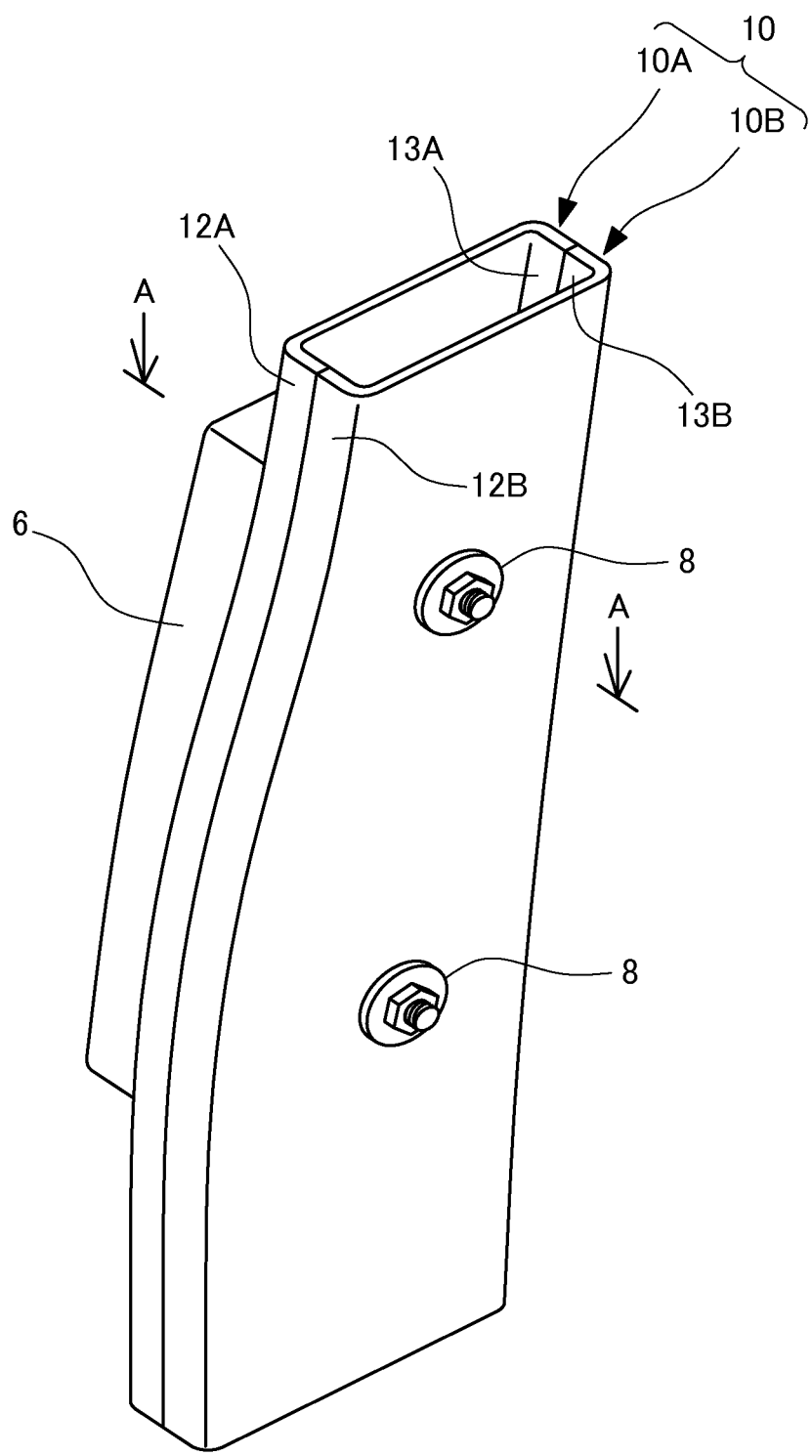
FIG. 3 is an explanatory perspective view of an airbag module-mounting side frame according to the first embodiment of the present invention.

As illustrated in FIG. 3, the outer frame 10A includes an outer side plate 11A having an approximately flat-plate shape, an outer front edge 12A formed by folding a front end of the outer side plate 11A inwardly in an L-shape, and an outer rear edge 13A formed by bending a rear end of the outer side plate 11A inwardly in an L-shape.

Similarly, as illustrated in FIG. 3, the inner frame 10B includes an inner side plate 11B having an approximately flat-plate shape, an inner front edge 12B formed by folding a front end of the inner side plate 11B inwardly in an L-shape, and an inner rear edge 13B formed by bending a rear end of the inner side plate 11B inwardly in an L-shape.

The outer frame 10A and the inner frame 10B formed in this manner are combined by putting a free-end side of the outer front edge 12A and a free-end side of the inner front edge 12B together and putting a free-end side of the outer rear edge 13A and a free-end side of the inner rear edge 13B together.

In this case, an inner surface (a surface on a side facing the direction in which the outer front edge 12A and the outer rear edge 13A are erected) of the outer side plate 11A faces an inner surface (a surface on a side facing the direction in which the inner front edge 12B and the inner rear edge 13B are erected) of the inner side plate 11B.

In this manner, since the outer frame 10A and the inner frame 10B are combined, at the time of the completion of the side frame 10, the side frame 10 has an approximately cylindrical shape.

That is, the side frame 10 has a structure having a closed cross-section.

The outer frame 10A and the inner frame 10B are configured to be detached from each other.

Thus, the maintenance property of an attachment portion of the airbag module 6 described later is improved.

Further, in the present embodiment, the outer frame 10A and the inner frame 10B are configured such that the frames are separated in the width direction of the vehicle seat S and are connected at least at two positions (in this example, two positions) with an attachment position of the airbag module 6 described later interposed in the front to back direction.

With such a configuration, the supporting rigidity of the airbag module 6 described later is improved.

Further, the bonding force is applied in the direction following the direction of the attachment force of the airbag module 6 described later. Due to this, the bonding rigidity of the outer frame 10A and the inner frame 10B is improved.

The airbag module 6 is fixed to the side frame 10.

The airbag module 6 is attached to an outer surface (a surface on a side facing the direction opposite to the direction in which the outer front edge 12A and the outer rear edge 13A are erected) of the outer side plate 11A of the outer frame 10A.

FIG. 1 illustrates an arrangement position of the airbag module 6 only, and an attachment method and the like will be described later with reference to FIG. 3 (cross-sectional view along line A-A) and other figures.

Here, the airbag module 6 and an attachment structure of the airbag module 6 will be described briefly. Since the configuration itself of the airbag module 6 is not a focus, the configuration of the airbag module 6 will be described only briefly.

The airbag module 6 according to the present embodiment may be an existing airbag module, and an example thereof will be illustrated briefly below.

The airbag module 6 includes an inflator 61, a retainer 62, and an airbag 63, and the like.

The inflator 61 is attached to the side frame 10 in a state of being held by the retainer 62, and an upper end of the inflator 61 is inserted into the airbag 63.

Moreover, a base portion of the airbag 63 is attached to the retainer 62.

In this example, inflator holding portions 62A and 62A are provided on both ends of the retainer 62, and the inflator 61 passes through inflator holding holes 62a and 62a formed in the respective inflator holding portions 62A and 62A so that the inflator 61 is held.

The retainer 62 to which these respective members (the inflator 61 and the airbag 63) are attached directly or indirectly is attached to the outer surface (a surface facing a side opposite to the side on which the seat surface is arranged) of the outer side plate 11A of the outer frame 10A that forms the side frame 10.

Moreover, although a related apparatus such as an impact sensor and harnesses and connectors required for forming circuits are also arranged around the retainer, since an arrangement method and an arrangement position are the same as those of the existing technique, the description thereof will not be provided.

In the airbag module 6 having such a configuration, when a large load is applied to the vehicle interior from the outside of a vehicle door (a so-called "side collision" occurs) and corresponding signals are transmitted by various sensors, the inflator 61 discharges gas, and the airbag 63 is inflated and deployed outward from the lateral side of the seat (the lateral side of an occupant).

The present embodiment illustrates a configuration example of a so-called "caseless airbag module" in which the retainer 62 in which the inflator 61 and the like are arranged is attached to the side frame 10 (the outer surface of the outer frame 11A).

However, the present invention is not limited to this, and an entire airbag module may be accommodated inside a module case as long as portions necessary for attachment are exposed to the outside.

In this case, as the module case, a module case in which an openable lid is connected to a case body by a hinge or a module case which is formed of a housing including a case body having a fragile portion such as a V-groove formed in a front surface thereof and a lower plate and which can be opened by inflation pressure of the airbag 63 may be used.

Airbag Module Attachment Method

Next, an attachment structure for attaching the airbag module 6 (the retainer 62) to the side frame 10, which is a main configuration, will be described.

As illustrated in FIG. 3, the side frame 10 according to the present embodiment is an approximately hollow cylindrical member, and the airbag module 6 is arranged on the outer surface of the outer side plate 11A and is attached toward the inner side plate 11B.

That is, the airbag module 6 is attached to pass through the hollow portion of the side frame 10.

Hereinafter, a method of attaching the airbag module 6 with high rigidity even when a hollow portion (closed cross-sectional structure) is present in the attachment position will be described.

Figure 4:
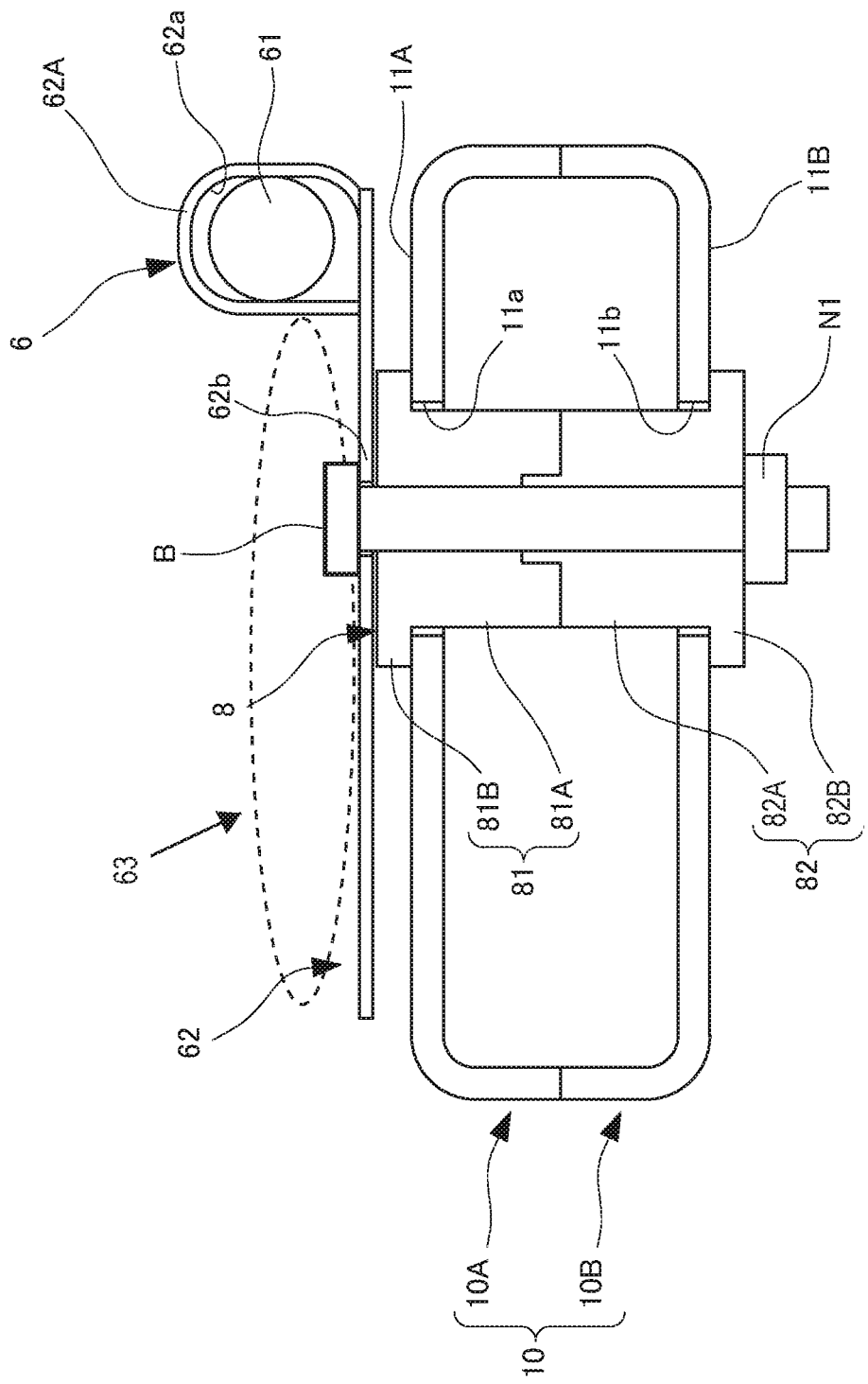
FIG. 4 is a cross-sectional view along line A-A in FIG. 3.

As illustrated in FIGS. 3 and 4, the airbag module 6 is attached to the side frame 10 by an airbag attachment member 8.

Figure 5:
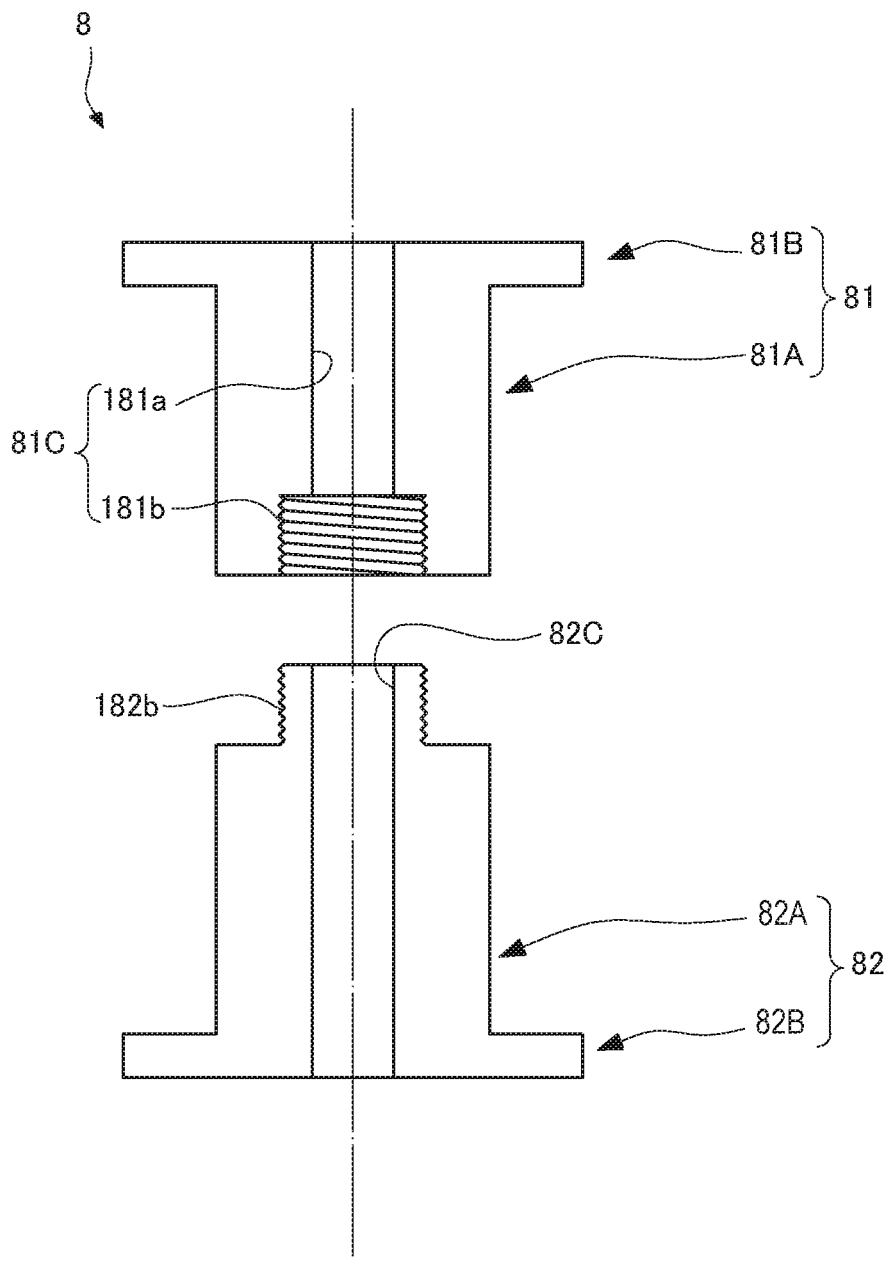
FIG. 5 is a cross-sectional view diagram corresponding to a longitudinal cross-sectional view of an airbag attachment member according to the first embodiment of the present invention.

As illustrated in FIG. 5, the airbag attachment member 8 is formed by combining a first main body 81 and a second main body 82.

The first main body 81 is an approximately T-shaped member in a cross-sectional view, including a first body portion 81A having an approximately columnar shape and a first head portion 81B having a larger bottom area and a smaller height than the first body portion 81A.

The first head portion 81B is stacked on one bottom surface of the first body portion 81A so that the bottom surfaces thereof are concentrically arranged.

A first bolt insertion hole 81C is formed in the central portion along an axial direction of the first main body 81.

The first bolt insertion hole 81C is formed to pass through the bottom surface of the first head portion 81B and the bottom surface (a bottom surface on a side opposite to the side where the first head portion 81B is formed) of the first body portion 81A.

Moreover, the first bolt insertion hole 81C includes a first bolt insertion portion 181a and a first thread portion 181b.

The first bolt insertion portion 181a is a hole formed along the axial direction from the bottom surface (a bottom surface on a side opposite to the side where the first body portion 81A is arranged) of the first head portion 81B.

Moreover, the first thread portion 181b is a hole formed along the axial direction from the bottom surface (a bottom surface on a side opposite to the side where the first head portion 81B is arranged) of the first body portion 81A.

The first bolt insertion portion 181a and the first thread portion 181b communicate coaxially.

In the present embodiment, a hole diameter of the first thread portion 181b is larger than a hole diameter of the first bolt insertion portion 181a, and an axial length of the first thread portion 181b is smaller than an axial length of the first bolt insertion portion 181a.

An inner wall of the first thread portion 181b is threaded to engage with a second thread portion 182b described later.

The second main body 82 includes a second body portion 82A having an approximately columnar shape and a second head portion 82B having a larger bottom surface area and a smaller height than the second body portion 82A.

The second head portion 82B is stacked on one bottom surface of the second body portion 82A so that the bottom surfaces thereof are concentrically arranged.

A second bolt insertion hole 82C is formed in the central portion along an axial direction of the second main body 82.

Moreover, a second thread portion 182b is formed on a bottom surface (a bottom surface on a side opposite to the side where the second head portion 82B is formed) of the second body portion 82A.

The second thread portion 182b has an approximately columnar shape and is formed in such a size that a bottom surface area is smaller than the bottom surface area of the second body portion 82A and matches the inner diameter of the first thread portion 181b described above. The second thread portion 182*b* is arranged concentrically with the bottom surface of the second body portion 82A.

An outer shape of the second thread portion 182*b* matches the inner shape of the first thread portion 181*b* three-dimensionally.

The outer surface of the second thread portion 182*b* is threaded to engage with the inner surface of the first thread portion 181*b* described above.

Moreover, the second bolt insertion hole 82C is formed along the axial direction to pass through the bottom surface of the second head portion 82B and the bottom surface (a bottom surface on a side opposite to the side where the second body portion 82A is formed) of the second thread portion 182*b*.

The first main body 81 and the second main body 82 having such a configuration are connected by engaging the first thread portion 181*b* with the second thread portion 182*b* as described above. As a result, the first bolt insertion hole 81C and the second bolt insertion hole 82C communicate with each other to form the integrated airbag attachment member 8.

The airbag attachment member 8 having such a configuration connects the retainer 62 that forms the airbag module 6 to the side frame 10.

In this case, the sum of the axial lengths of the first body portion 81A and the second body portion 82A is approximately the same as the distance between the outer side plate 11A and the inner side plate 11B (that is, the distance in the seat width direction of a space formed when the outer frame 10A and the inner frame 10B are put together). That is, the first and second body portions 81A and 82B are accommodated in the closed cross-sectional structure of the side frame 10.

Due to this, tightening can be performed across both frames.

Thus, it is possible to prevent deformation of the side frame 10 effectively when the airbag module 6 is attached and to increase the rigidity of the side frame 10.

Moreover, when the airbag attachment member 8 is made from iron, loosening of a nut N1 with aging can be prevented effectively.

Further, the airbag attachment member 8 according to the present embodiment is configured to be received in the closed cross-sectional structure of the side frame 10.

Due to this, compact arrangement can be realized, which contributes to a reduction in the size.

Next, a method of connecting the side frame 10 and the retainer 62 that forms the airbag module 6 will be described with reference to FIGS. 6 and 7.

For the sake of description, the airbag module 6 is not illustrated in FIG. 7.

First, the first main body 81 is attached to an outer attachment hole 11*a* formed in the outer side plate 11A.

In this case, the diameter of the outer attachment hole 11*a* is smaller than the diameter of the first head portion 81B and is larger than the diameter of the first body portion 81A. When the free end of the first body portion 81A is inserted from the outer side (the side opposite to the side where the inner frame 10B is arranged) of the outer side plate 11A, the first body portion 81A is locked at the first head portion 81B.

Similarly, the second main body 82 is attached to an inner attachment hole 11*b* formed in the inner side plate 11B.

In this case, the diameter of the inner attachment hole 11*b* is smaller than the diameter of the second head portion 82B and is larger than the diameter of the second body portion 82A. When the free end of the second body portion 82A is inserted from the outer side (the side opposite to the side where the outer frame 10A is arranged) of the inner side plate 11B, the second body portion 82A is locked at the second head portion 82B.

In this state, the first thread portion 181*b* and the second thread portion 182*b* are engaged and integrated.

This state is illustrated in FIG. 6.

A retainer bolt hole 62*b* formed in the retainer 62 communicates with a communication hole R1 of the first bolt insertion hole 81C and the second bolt insertion hole 82C, a fastening bolt B is inserted into the communication hole R1 from the retainer 62, and the nut N1 is set and bolt-fastened to the inner side plate 11B.

In this manner, as illustrated in FIGS. 3 and 4, the airbag module 6 (the retainer 62) is attached to the side frame 10.

In this example, since the outer surface of the side frame 10 is restricted in the width direction of the vehicle seat S by the first head portion 81B and the second head portion 82B, the attachment rigidity of the airbag module 6 is improved.

Second Embodiment

Next, a second embodiment will be described with reference to FIGS. 8 to 10.

The same configurations as those of the first embodiment will not be described or be described briefly, and the different portions will be described mainly.

In the present embodiment, an airbag attachment member 108 according to another example is used instead of the airbag attachment member 8.

Since the airbag attachment member 108 of this further example is a mechanism that can be replaced with the airbag attachment member described above, the same name is used and a different reference numeral is used for distinction.

As illustrated in FIGS. 8 and 9, the airbag attachment member 108 includes a bridging main body 108A, a screw leg 108B, and a fastening portion 108C.

The bridging main body 108A is an approximately columnar portion and the screw leg 108B stands on a central portion of one bottom surface thereof.

Moreover, the fastening portion 108C having an approximately columnar shape is formed on the central portion of the other bottom surface.

A fastening-side wrench hole 108*a* is formed in the central portion of the fastening portion 108C along the axial direction, and a body-side wrench hole 108*b* is formed in a bottom surface (a bottom surface on the side where the fastening portion 108C is formed) of the bridging main body 108A as an approximately columnar cup-shaped concave portion.

The fastening-side wrench hole 108*a* and the body-side wrench hole 108*b* communicate to form a communication wrench hole R2.

The communication wrench hole R2 functions as a hexagonal wrench hole.

Next, a method of connecting the side frame 10 to the retainer 62 that forms the airbag module 6 will be described with reference to FIGS. 8 and 10.

First, the screw leg 108B is inserted into a communication hole between the retainer bolt hole 62*b* and the outer attachment hole 11*a* formed in the outer side plate 11A from the inner side (the side where the inner side plate 11B is arranged) of the outer side plate 11A.

In this case, a projection nut N2 is welded to the outer side (a side opposite to the side where the outer side plate 11A is arranged) of the retainer bolt hole 62*b*, and the screw leg 108B is threaded toward the projection nut N2. The screw leg 108B can be inserted using a hexagonal wrench with the aid of the communication wrench hole R2 formed on the opposite side.

In this way, after the outer side plate 11A and the retainer 62 are connected, the outer side plate 11A is combined with the inner frame 10B.

In this case, the axial length of the bridging main body 108A is approximately the same as the distance between the outer side plate 11A and the inner side plate 11B (that is, the distance in the seat width direction of a space formed when the outer frame 10A and the inner frame 10B are put together).

Moreover, the fastening portion 108C is configured to engage with the inner attachment hole 11b formed in the inner side plate 11B.

That is, in a state in which the outer frame 10A and the inner frame 10B are combined, an end surface of the fastening portion 108C is exposed to the outer side (the side opposite to the side where the outer side plate 11A is arranged) of the inner frame 10B.

Due to this, even after the outer frame 10A and the inner frame 10B are combined, it is possible to access the communication wrench hole R2 and to visually check the portion.

Thus, the retainer 62 may be put in a temporarily tightened state and be finally tightened after both frames 10A and 10B are combined. Thus, the tightening state of the retainer 62 can be corrected easily during maintenance.

The axial length of the bridging main body 108A may be smaller than the distance between the outer side plate 11A and the inner side plate 11B (the distance in the seat width direction of a space formed when the outer frame 10A and the inner frame 10B are put together).

In this case, it is possible to access the communication wrench hole and to visually check the portion.

Due to this, similarly to the above embodiment, tightening can be performed across both frames, deformation of the side frame 10 can be prevented effectively, and the rigidity of the side frame 10 can be improved. Moreover, it is possible to improve attachment workability and maintenance property effectively.

Moreover, similarly to the above embodiment, if the airbag attachment member 108 is made from iron, it is possible to prevent loosening of the nut with aging effectively.

Third Embodiment

Next, a third embodiment of the present invention will be described.

In this example, the same configurations as those of the first embodiment will be denoted by the same reference numerals.

Figure 11:
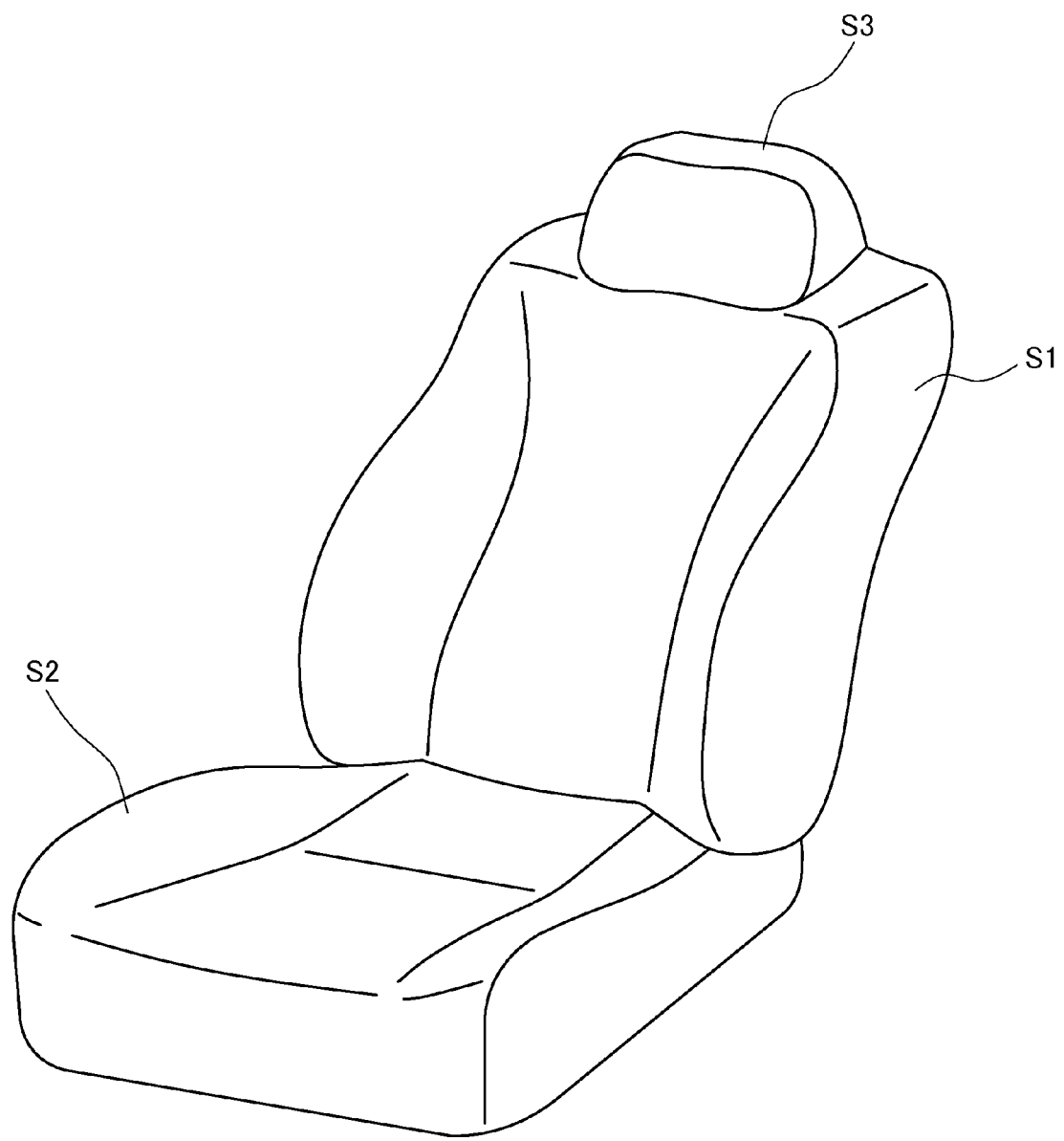
FIG. 11 is an external view of an airbag module-equipped seat according to a third embodiment of the present invention.

As illustrated in FIG. 11, a vehicle seat S according to the present embodiment includes a seat back S1, a seating portion S2, and a headrest S3.

A seat frame F is provided in the vehicle seat S. An existing frame is used as the seat frame F except for the structure (the attachment portion of the airbag module 6) of the side frame 10 that forms the seat back frame 1, which will be described later.

Figure 12:
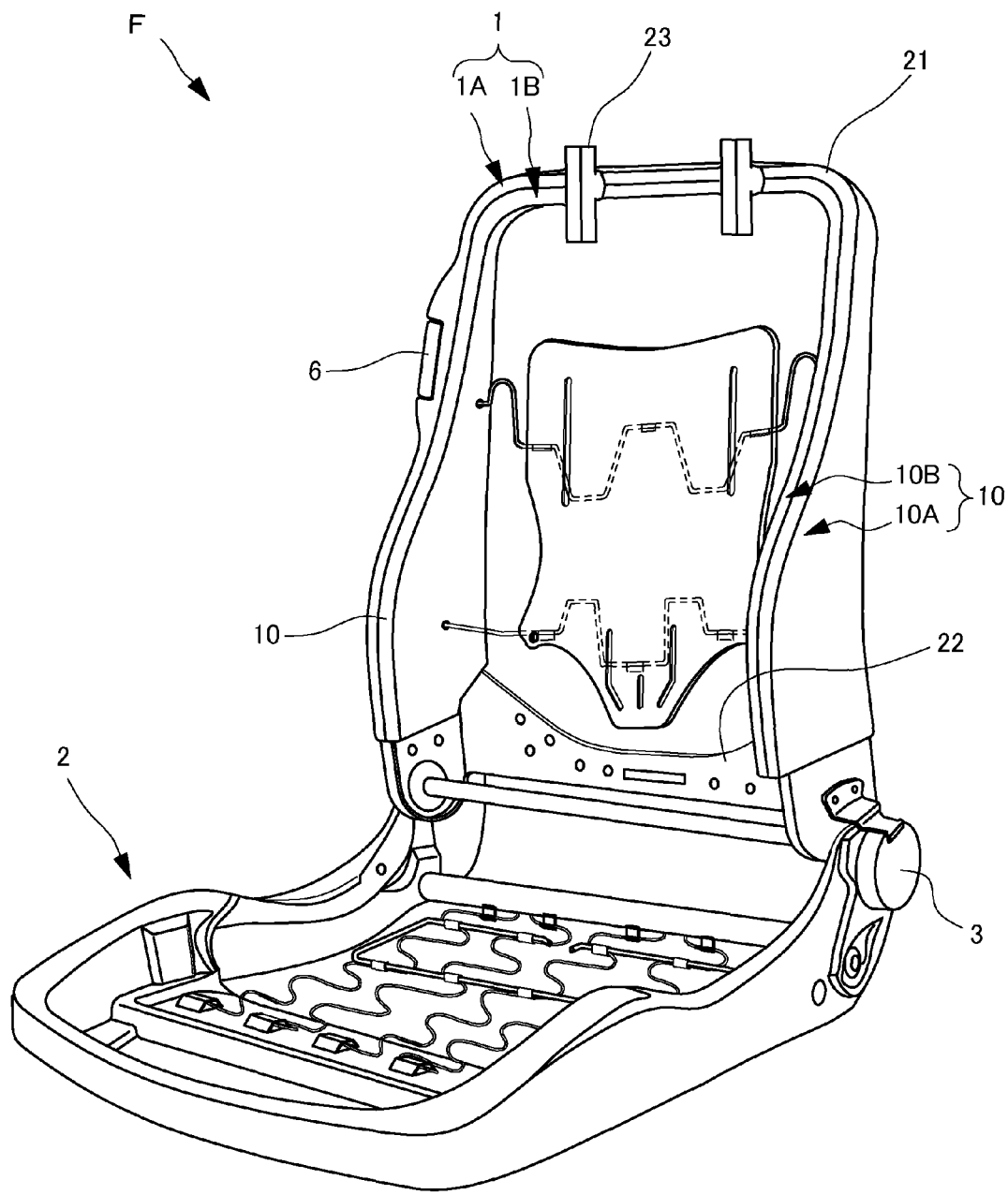
FIG. 12 is a perspective view of a seat back frame according to the third embodiment of the present invention.

An example will be described briefly. As illustrated in FIG. 12, the seat frame F includes a seat back frame 1 which is a frame of the seat back S1 and a seating frame 2 which is a frame of the seating portion S2.

The seating frame 2 is formed in a rectangular frame in a plan view, and in particular, in the present embodiment, is preferably integrally molded with carbon fiber-reinforced plastic (CFRP) as a resin material.

Moreover, in general, the seating frame 2 and the seat back frame 1 are connected by a reclining mechanism 3, and the angle of the seat back frame 1 in relation to the seating frame 2 can be changed.

A cushion and a trim cover are provided on the outer side of the seat back frame 1 and the seating frame 2 whereby the seat back S1 and the seating portion S2 are formed.

The seat back S1 includes the seat back frame 1, a cushion pad placed on the seat back frame 1, and a trim cover that covers the seat back frame 1 and the cushion pad.

A pair of stay clothes has one end sewn to a breaking portion of a trim cover, which is not illustrated in the drawings in this example because this configuration is not of great significance, and a deployment force is transmitted to the breaking portion of the trim cover during deployment of an airbag mounted on an airbag module 6.

As described above, the seat back frame 1 is an existing frame except for the structure (the attachment portion of the airbag module 6) of the side frame 10.

Hereinafter, a basic structure will be described briefly. The seat back frame 1 is formed in a frame shape and includes side frames 10 disposed to be separated from each other in the right and left direction and to extend in the up to down direction, an upper frame 21 that connects the upper ends of the side frames 10, and a lower frame 22 that connects the lower ends of the side frames 10.

In this example, although the side frames 10 and 10, the upper frame 21, and the lower frame 22 are formed integrally (continuously) in an approximately rectangular shape, names are given to the respective portions for the sake of convenience.

Moreover, pillar supporting portions 23 are provided in the upper frame 21, and a headrest frame is attached to the pillar supporting portions 23. A cushion member is provided on the outer side of the headrest frame whereby the headrest S3 is formed.

The seat back frame 1 is formed as a hollow frame by combining an outer frame 1A that forms the outer side and an inner frame 1B that forms the inner side.

As described above, since the seat back frame 1 except for the structure (the attachment portion of the airbag module 6) of the side frame 10 is an existing frame, the structure (the attachment portion of the airbag module 6) of the side frame 10 will be described mainly.

Moreover, as described above, although the side frame 10 is a "part" of the seat back frame 1, in this example, the side frame 10 will be referred to simply as the "side frame 10" (that is, the expression "part" will be omitted) for the sake of convenience. The same is true for the respective constituent members of the side frame 10.

The side frame 10 according to the present embodiment is formed by combining an outer frame 10A and an inner frame 10B in the present embodiment.

Figure 14:
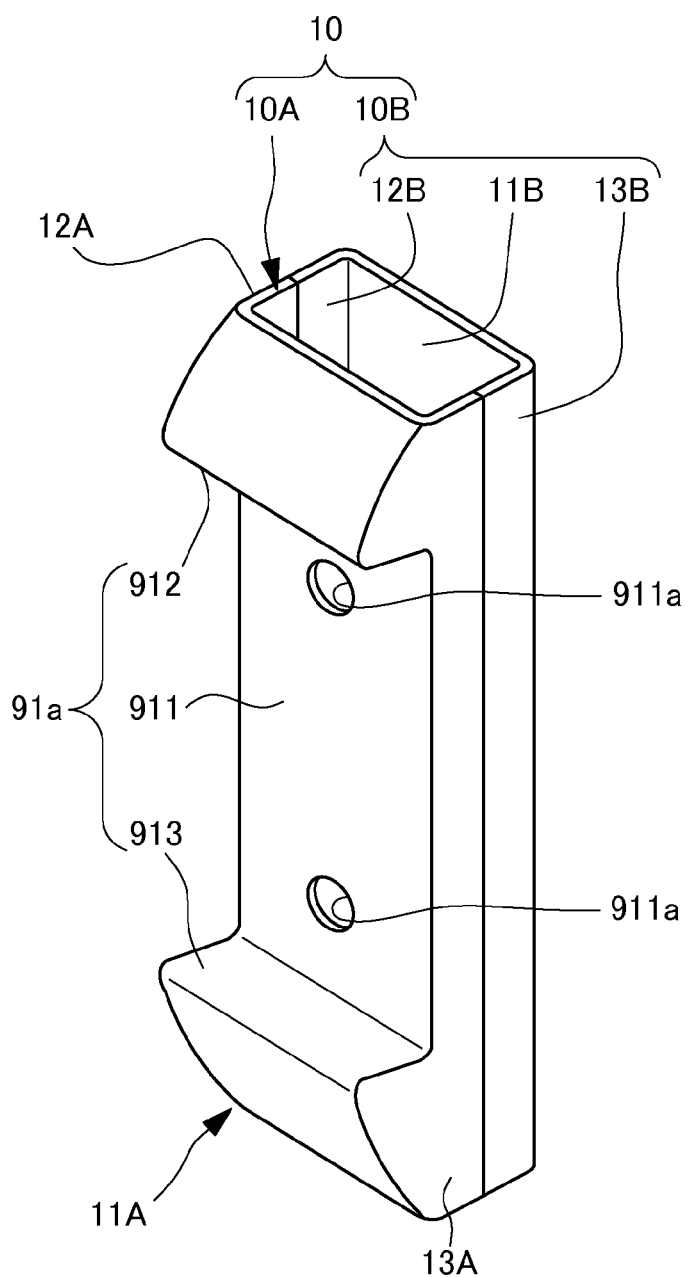
FIG. 14 is an explanatory perspective view illustrating an airbag module mounting portion of the side frame according to the third embodiment of the present invention.

As illustrated in FIG. 14, the outer frame 10A includes an outer side plate 11A that forms the outer surface, an outer front edge 12A formed by folding a front end of the outer side plate 11A inwardly in an L-shape, and an outer rear edge 13A formed by bending a rear end of the outer side plate 11A inwardly in an L-shape.

Moreover, an arrangement recess 91a is formed in the outer side plate 11A.

The arrangement recess 91a is a space formed by a bottom portion 911, an upper surface 912 that stands outwardly approximately vertically to the bottom portion 911 from an upper side of the bottom portion 911, and a lower surface 913 that stands outwardly approximately vertically to the bottom portion 911 from a lower side of the bottom portion 911.

That is, the arrangement recess 91a is a space formed in the outer side plate 11A to be recessed inwardly as a recess.

Moreover, member attachment holes 911a and 911a are formed in the bottom portion 911 in parallel in the up to down direction. One member attachment hole 911a is formed at a position near the upper surface 912, and the other is formed at a position near the lower surface 913.

Similarly, as illustrated in FIG. 14, the inner frame 10B includes an inner side plate 11B having an approximately flat-plate shape, an inner front edge 12B formed by folding a front end of the inner side plate 11B outwardly in an L-shape, and an inner rear edge 13B formed by bending a rear end of the inner side plate 11B outwardly in an L-shape.

The outer frame 10A and the inner frame 10B formed in this manner are combined by putting a free-end side of the outer front edge 12A and a free-end side of the inner front edge 12B together and putting a free-end side of the outer rear edge 13A and a free-end side of the inner rear edge 13B together.

In this case, an inner surface (a surface on a side facing the direction in which the outer front edge 12A and the outer rear edge 13A are erected) of the outer side plate 11A faces an inner surface (a surface on a side facing the direction in which the inner front edge 12B and the inner rear edge 13B are erected) of the inner side plate 11B.

In this manner, since the outer frame 10A and the inner frame 10B are combined, at the time of the completion of the side frame 10, and the side frame 10 has an approximately cylindrical shape.

That is, the side frame 10 has a structure having a closed cross-section.

The outer frame 10A and the inner frame 10B are configured to be detached from each other.

Thus, the maintenance property of an attachment portion of the airbag module 6 described later is improved.

Moreover, when the arrangement recess 91a is not used (that is, when the airbag module 6 is not arranged), the outer frame having no arrangement recess 91a is attached to the inner frame 10B, the side frame can be easily used as a side frame on which the airbag module 6 is not mounted.

Further, in the present embodiment, the outer frame 10A and the inner frame 10B are configured such that the frames are separated in the width direction of the vehicle seat S and are connected at least at two positions (in this example, two positions) with an attachment position of the airbag module 6 described later interposed in the front to back direction.

With such a configuration, the supporting rigidity of the airbag module 6 described later is improved.

Further, the bonding force is applied in the direction following the direction of the attachment force of the airbag module 6 described later. Due to this, the bonding rigidity of the outer frame 10A and the inner frame 10B is improved, which is preferable.

Moreover, the airbag module 6 is fixed to the arrangement recess 91a formed in the side frame 10.

Figure 13:
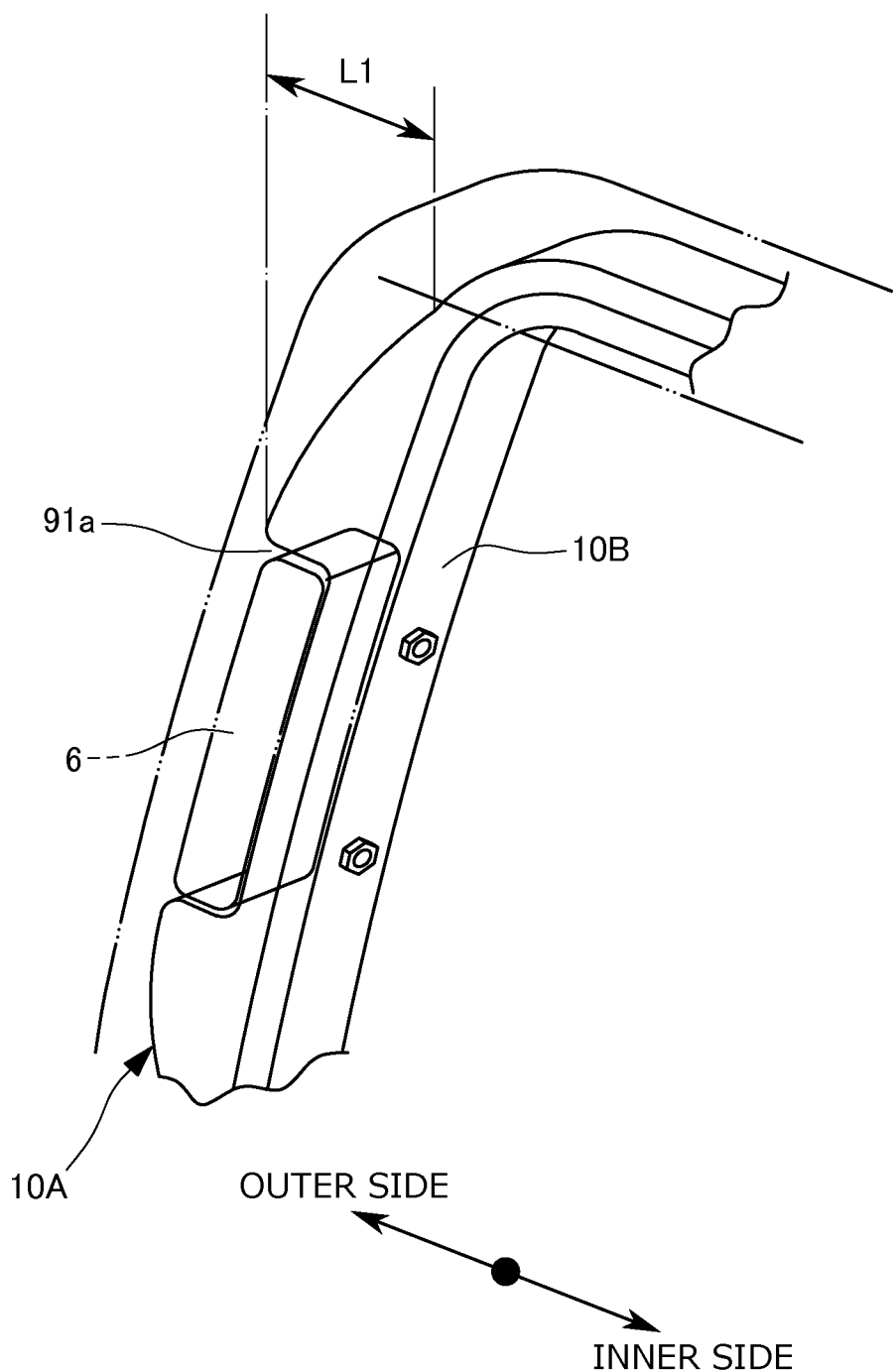
FIG. 13 is an explanatory perspective view illustrating the state of an airbag module attached to a side frame according to the third embodiment of the present invention.

FIG. 13 illustrates an arrangement position of the airbag module 6 only, and an attachment method and the like will be described later with reference to FIGS. 14 to 16 and other figures.

Here, the airbag module 6 and an attachment structure of the airbag module 6 will be described briefly. Since the configuration itself of the airbag module 6 is not a focus, the configuration of the airbag module 6 will be described only briefly.

The airbag module 6 according to the present embodiment may be an existing airbag module, and an example thereof will be illustrated briefly below.

The airbag module 6 is an existing mechanism which includes an inflator and an airbag.

In the present embodiment, the airbag module 6 is supported by the module attachment member 162 and is arranged in the arrangement recess 91a of the outer frame 10A.

The inflator 61 is attached to the arrangement recess 91a of the outer frame 10A in a state of being held by the module attachment member 162, and the upper end of the inflator 61 is inserted into the airbag 63.

Moreover, a base portion of the airbag 63 is attached to the module attachment member 162.

In this manner, the module attachment member 162 to which these respective members (the inflator 61 and the airbag 63) are attached directly or indirectly is attached to the arrangement recess 91a of the outer frame 10A that forms the side frame 10.

Moreover, although a related apparatus such as an impact sensor and harnesses and connectors required for forming circuits are also arranged around the retainer, since an arrangement method and an arrangement position are the same as those of the existing technique, the description thereof will not be provided.

In the airbag module 6 having such a configuration, when a large load is applied into the vehicle from the outside of a vehicle door (a so-called "side collision" occurs) and corresponding signals are transmitted by various sensors, the inflator 61 discharges gas, the airbag 63 is inflated and deployed outward from the lateral side of the seat (the lateral side of an occupant).

The present embodiment illustrates a configuration example of a so-called "caseless airbag module" in which the module attachment member 162 in which the inflator 61 and the like are arranged is attached to the side frame 10 (the arrangement recess 91a of the outer frame 11A).

However, the present invention is not limited to this, and an entire airbag module or a portion thereof may be accommodated inside a module case as long as portions necessary for attachment are exposed to the outside.

In this case, as the module case, a module case in which an openable lid is connected to a case body by a hinge or a module case which is formed of a housing including a case body having a fragile portion such as a V-groove formed in a front surface thereof and a lower plate and which can be opened by inflation pressure of the airbag may be used.

Airbag Module Attachment Method

Next, an attachment structure for attaching the airbag module 6 (the module attachment member 162) to the side frame 10, which is a main configuration, will be described.

As illustrated in FIG. 13, the side frame 10 according to the present embodiment is an approximately hollow cylindrical member, and the airbag module 6 is arranged in the arrangement recess 91a formed in the outer side plate 11A.

As illustrated in FIGS. 14 to 16, the airbag module 6 is supported by the module attachment member 162 and is attached to the arrangement recess 91a of the outer frame 10A.

Figure 15A:
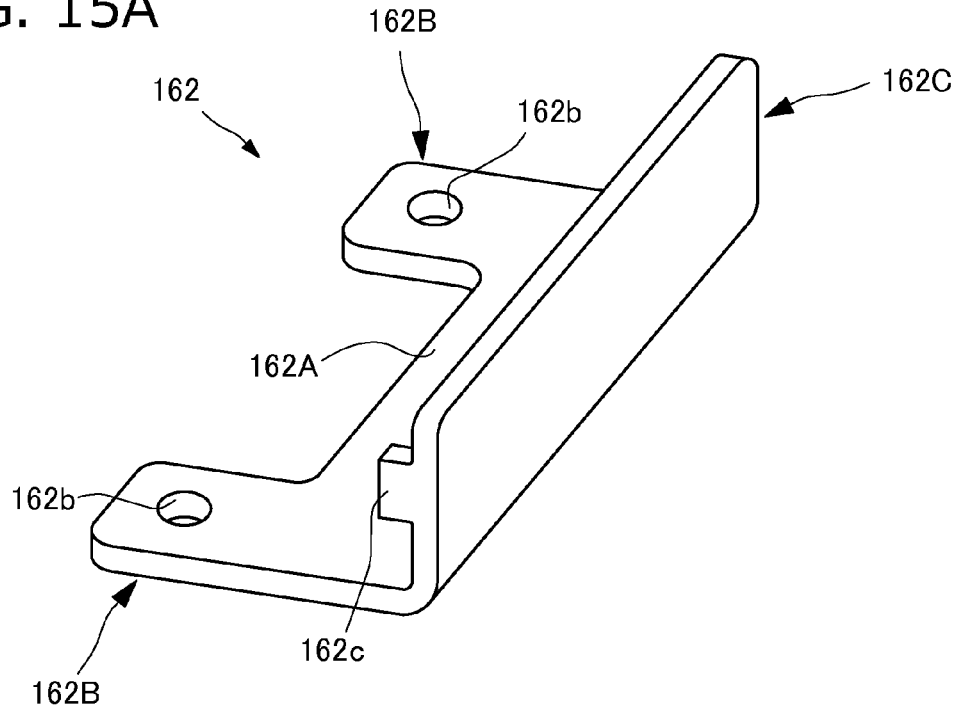
FIGS. 15A, B are explanatory perspective views of a module attachment member according to the third embodiment of the present invention.

As illustrated in FIG. 15A, the module attachment member 162 includes a base portion 162A, fastening portions 162B and 162B, and a restricting portion 162C.

The base portion 162A is an approximately rectangular portion and the fastening portions 162B and 162B, having an approximately rectangular shape, extend from both ends of the longer sides of the base portion.

Bolt holes 162b and 162b are formed in the central portions of the fastening portions 162B and 162B.

Since a gap is formed between the fastening portions 162B and 162B having an approximately rectangular shape, the area of the attachment portion of the restricting portion 162C can be suppressed as much as possible.

The base portion 162A and the fastening portions 162B and 162B correspond to a "rearward extension portion".

Moreover, the restricting portion 162C stands from one longer side of the base portion 162A approximately vertically to the base portion 162A.

Frame fixing claws 162c and 162c having an approximately rectangular shape are formed near approximately the center of both shorter sides (the shorter side erected approximately vertically from the base portion 162A) of the restricting portion 162C to extend in the same direction as the extension direction of the fastening portion 162B.

The frame fixing claws 162c and 162c can be brought into pressure-contact with the upper surface 912 and the lower surface 913 that form the arrangement recess 91a, and the module attachment member 162 can be held in the arrangement recess 91a.

Due to this, it is possible to improve the holding force and to temporarily fix the module attachment member 162 into the arrangement recess 91a before final fixing is realized by a bolt. Therefore, it is possible to improve the final fixing workability.

The formation positions of the frame fixing claws 162c and 162c can be changed appropriately.

Figure 15B:
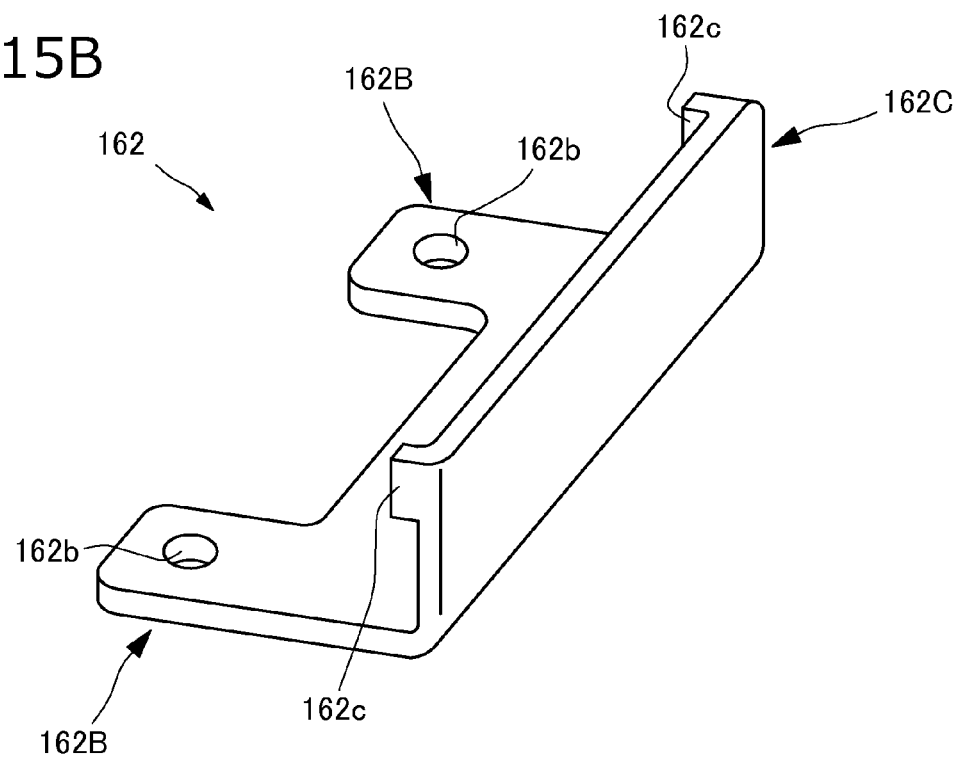

For example, as illustrated in FIG. 15B, the frame fixing claws may be formed in the free ends of both shorter sides (the shorter side erected approximately vertically from the base portion 162A) of the restricting portion 162C to extend in the same direction as the extension direction of the fastening portion 162B.

With this configuration, the frame fixing claws can be brought into pressure-contact with the upper surface 912 and the lower surface 913 that form the arrangement recess 91a and can be brought into abutting-contact with a separate cover which is arranged (which however may not be arranged) in an outer opening of the arrangement recess 91a. Thus, the attachment rigidity is improved further.

As illustrated in FIGS. 15A to 17, the bolt holes 162b and 162b formed in the module attachment member 162 are arranged to communicate with the member attachment holes 911a formed in the bottom portion 911 of the arrangement recess 91a, and the module attachment member 162 is attached to the arrangement recess 91a (the bottom portion 911) by being bolt-fastened through the communication holes.

In this case, the restricting portion 162C of the module attachment member 162 is attached to be arranged on the front side.

Due to such a configuration, the restricting portion 162C is positioned on the front side of the airbag module 6 and performs the function of a restricting member that restricts the deployment direction of the airbag.

The base portion 162A and the restricting portion 162C may preferably be connected by a hinge which is provided at the boundary between these portions to be pivoted with the deployment of the airbag. In this way, it is possible to restrict the deployment direction of the airbag efficiently.

Although the example of a hinge has been illustrated, an optional configuration such as the use of biasing force of an elastic member may be employed.

Figure 17:
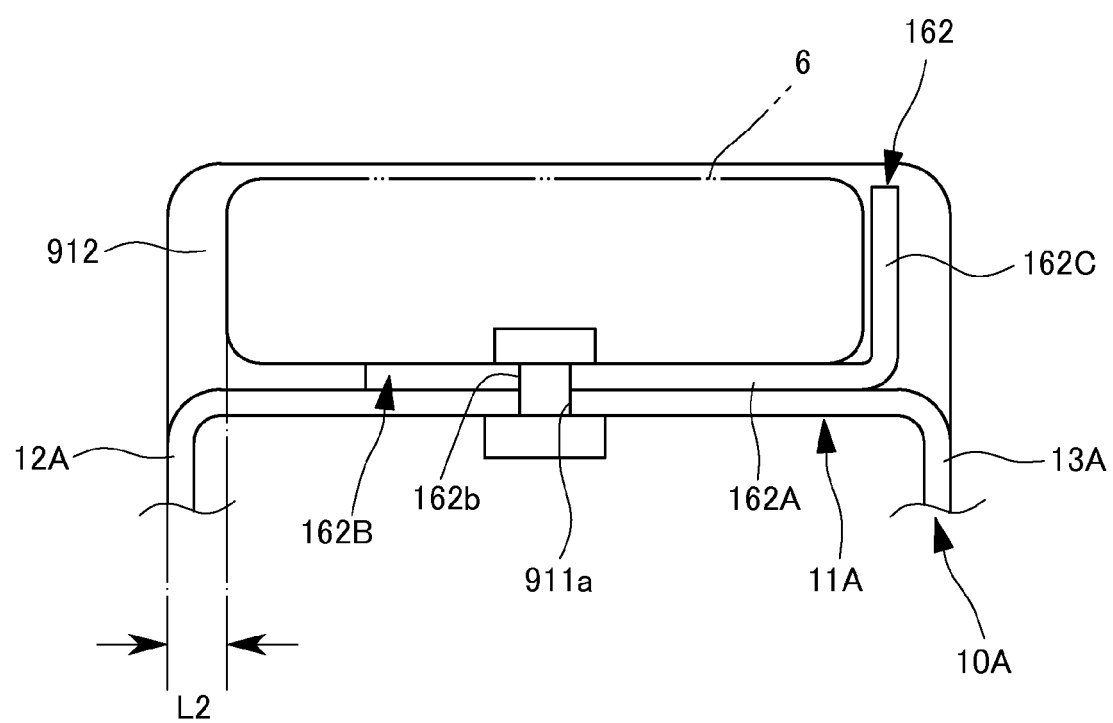
FIG. 17 is a cross-sectional view along line A-A in FIG. 16.

As illustrated in FIG. 17, an outer end of the upper surface 912 protrudes outwardly by a distance of L2 from the outer upper end of the airbag module 6.

That is, the outer upper end of the airbag module 6 is disposed closer to the inner side than the upper surface 912 that forms the upper side of the arrangement recess 91a.

Moreover, the outer surface of the airbag module 6 is positioned closer to the inner side than a surface that connects the outer-end side of the upper surface 912 and the outer-end side of the lower surface 913.

Further, as illustrated in FIG. 13, the outer-end side of the upper surface 912 is positioned closer to the outer side by a distance of L1 than the upper end of the outer frame 10.

That is, the outer surface of the outer frame 10A is formed as an inclined surface or a curved surface that protrudes gently outward to extend from the upper end of the outer frame 10A to the outer-end side of the upper surface 912.

Due to such a configuration, the airbag module 6 can be disposed in a compact space.

The outer opening of the arrangement recess 91a may be covered by a separate cover after the airbag module 6 is mounted.

In this example, an example of the attachment structure of the module attachment member 162 has been illustrated. Naturally, as illustrated in FIG. 13, the airbag attachment member 8 according to the first embodiment or the airbag attachment member 108 according to the second embodiment may be preferably used when attaching the module attachment member 162 of this example.

As an application example, although redundant description is not provided because it is the same as the description of the first embodiment, the module attachment member 162 may be read as the retainer 62 and the bolt holes may be formed appropriately.

Figure 18:
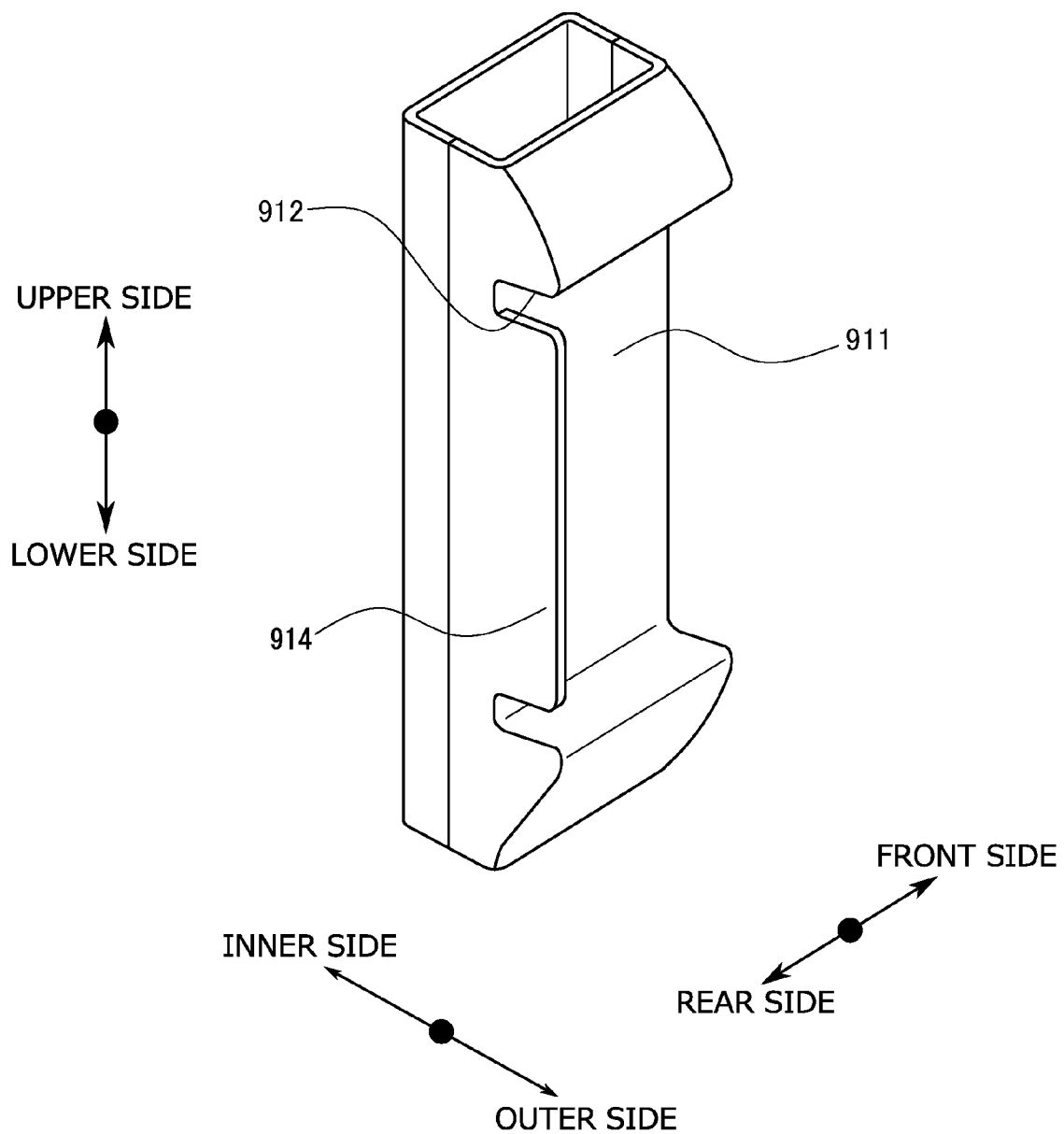
FIG. 18 is an explanatory perspective view illustrating an airbag module mounting portion of a side frame according to a modified example.

FIG. 18 is an explanatory perspective view illustrating a mounting portion of the airbag module 6 of the side frame 10 according to a modified example of the third embodiment.

In this example, a wall portion 914 erected toward the outer side is formed on the rear end of the bottom portion 911 of the arrangement recess 91a.

With this configuration, the rear surface of the airbag module 6 can be protected.

Moreover, the airbag module can be supported more reliably during deployment of the airbag.

REFERENCE NUMERALS

S vehicle seat (Seat)
S1 seat back
S2 seating portion
S3 headrest
F seat frame
B bolt
N1 nut
N2 projection nut
R1 communication hole
R2 communication wrench hole
1 seat back frame
10 side frame
10A outer frame
11A outer side plate
11a outer attachment hole
91a arrangement recess (third embodiment)
911 bottom portion (third embodiment)
911a member attachment hole (third embodiment)
912 upper surface (third embodiment)

913 lower surface (third embodiment)
914 wall portion (modified example of third embodiment)
12A outer front edge
13A outer rear edge
10B inner frame
11B inner side plate
11b inner attachment hole (hole)
12B inner front edge
13B inner rear edge
21 upper frame
22 lower frame
23 pillar supporting portion
2 seating frame
3 reclining mechanism
5 cushion pad
6 airbag module
61 inflator
62 retainer
62A inflator holding portion
62a inflator holding hole
62b retainer bolt hole
63 airbag
162 module attachment member (third embodiment)
162A base portion (rearward extension portion) (third embodiment)
162B fastening portion (rearward extension portion) (third embodiment)
162b bolt hole (third embodiment)
162C restricting portion (third embodiment)
162c frame fixing claw (third embodiment)
8 airbag attachment member (attachment member)
81 first main body (first attachment member)
81A first body portion
81B first head portion (head portion)
81C first bolt insertion hole
181a first bolt insertion portion
181b first thread portion
82 second main body (second attachment member)
82A second body portion
182b second thread portion
82B second head portion (head portion)
82C second bolt insertion hole
108 airbag attachment member (attachment member)
108A bridging main body
108B screw leg
108C fastening portion
108a fastening-side wrench hole
108b body-side wrench hole

The invention claimed is:

1. An airbag module-mounting side frame which forms a seat and on which an airbag module is mounted, comprising:
an attachment portion of the side frame to which the airbag module is attached, the attachment portion comprising a closed cross-sectional structure; and
an attachment member that connects the airbag module and the side frame disposed to connect an inner wall surface of the closed cross-sectional structure arranged on an outer side of the seat and an inner wall surface of the closed cross-sectional structure arranged on an inner side of the seat,
wherein:
the side frame comprises a plurality of frame members which are separated in a width direction of the seat and are detachable,
the side frame forms the closed-sectional structure by combining the plurality of frame members, and
the attachment member connects the plurality of frame members;
wherein:
the plurality of frame members are connected at at least two positions with an attachment position of the airbag module to the side frame interposed in the front to back direction.

2. The airbag module-mounting side frame according to claim 1, wherein:
the plurality of frame members are bonded in an attachment force direction following an application direction of attachment force when the airbag module is attached to the side frame.

3. The airbag module-mounting side frame according to claim 1, wherein:
the attachment member is accommodated in the closed cross-sectional structure of the side frame.

4. The airbag module-mounting side frame according to claim 3, wherein:
a hole is formed at a position of the side frame facing the attachment member.

5. The airbag module-mounting side frame according to claim 1, wherein:
the attachment member includes at least a first attachment member and a second attachment member;
the first attachment member is attached to extend from the airbag module and the second attachment member is attached to extend from a side opposite to the attachment position of the airbag module to the side frame with the closed cross-sectional structure interposed;
the first attachment member is connected to the second attachment member inside the closed cross-sectional structure;
a head portion is formed in the first attachment member and the second attachment member so that the first attachment member has a larger diameter than that of a portion connected to the second attachment member; and
the head portion is arranged on an outer surface of the side frame to restrict the outer surface of the side frame in a seat width direction.

6. A vehicle seat comprising at least:
a seat back frame having the side frame according to claim 1; and
a seating frame connected indirectly or directly to a portion of the seat back frame.

7. An airbag module-mounting side frame which forms a seat and on which an airbag module is mounted, comprising:
an arrangement recess which is a recess formed in an outer surface of the side frame in which the airbag module is arranged;
an attachment member that attaches the airbag module and that connects the airbag module and the side frame; and
a portion which is a surface forming an upper side of the arrangement recess and which is positioned near an upper end of the airbag module, the portion being formed to protrude outward,
an outer-end side of a surface that forms an upper side of the arrangement recess and faces an upper end surface of the airbag module:
is positioned closer to an outer side than the upper end surface of the airbag module, and
is positioned closer to the outer side than an outer upper end of the side frame.

8. The airbag module-mounting side frame according to claim 7, wherein:

the side frame is configured to be divided in a seat width direction, one frame is arranged on an inner side in the seat width direction, another frame is arranged on the outer side, and the arrangement recess is formed in the other frame, and the one frame can be detachably attached to the other frame.

9. The airbag module-mounting side frame according to claim 7, wherein:

a restricting portion that extends outward in a seat width direction is provided in a portion of the arrangement recess disposed closer to a front surface of the airbag module.

10. The airbag module-mounting side frame according to claim 9, wherein:

the restricting portion forms the attachment member which is formed as a separate member from the side frame, the attachment member further comprises a plurality of rearward extension portions extending at a predetermined angle from the restricting portion, a predetermined gap is formed between two adjacent rearward extension portions of the plurality of rearward extension portions, and when the plurality of rearward extension portions are attached to the arrangement recess, the restricting portion is arranged on a rear side, and the gap between the two adjacent rearward extension portions is recessed toward a front side.

11. The airbag module-mounting side frame according to claim 10, wherein:

the restricting portion is formed in a flat-plate shape, and
the restricting portion is pivotable in relation to the plurality of rearward extension portions.

12. The airbag module-mounting side frame according to claim 11, wherein:

a wall portion that extends outward in the seat width direction is provided on a portion of the arrangement recess disposed closer to a rear surface of the airbag module.

13. The airbag module-mounting side frame according to claim 10, wherein:

the restricting portion is pivotable in relation to the plurality of rearward extension portions by a hinge arranged in a boundary portion between the restricting portion and the plurality of rearward extension portions.

14. A vehicle seat comprising at least:

a seat back frame having the side frame according to claim 7; and a seating frame connected indirectly or directly to a portion of the seat back frame.

15. An airbag module-mounting side frame which forms a seat and on which an airbag module is mounted, comprising:

an attachment portion of the side frame to which the airbag module is attached, the attachment portion comprising a closed cross-sectional structure;

an arrangement recess which is a recess formed in an outer surface of the side frame in which the airbag module is arranged;

a portion which is a surface forming an upper side of the arrangement recess and which is positioned near an upper end of the airbag module, the portion being formed to protrude outward; and an attachment member that connects the airbag module and the side frame disposed to connect an inner wall surface of the closed cross-sectional structure arranged on an outer side of the seat and an inner wall surface of the closed cross-sectional structure arranged on an inner side of the seat.

16. A vehicle seat comprising at least:

a seat back frame having the side frame according to claim 15; and a seating frame connected indirectly or directly to a portion of the seat back frame.

* * * * *